United States Patent
Li et al.

(10) Patent No.: US 12,306,467 B2
(45) Date of Patent: May 20, 2025

(54) OPTICAL IMAGING LENS ASSEMBLY

(71) Applicant: Zhejiang Sunny Optics Co., Ltd, Yuyao (CN)

(72) Inventors: Yanping Li, Yuyao (CN); Qionghua Zhou, Yuyao (CN); Lingbo He, Yuyao (CN); Lin Huang, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 707 days.

(21) Appl. No.: 17/543,661

(22) Filed: Dec. 6, 2021

(65) Prior Publication Data
US 2022/0206253 A1    Jun. 30, 2022

(30) Foreign Application Priority Data

Dec. 28, 2020   (CN) .......................... 202011583348.X

(51) Int. Cl.
*G02B 9/62*     (2006.01)
*G02B 13/00*    (2006.01)

(52) U.S. Cl.
CPC ........... *G02B 9/62* (2013.01); *G02B 13/0045* (2013.01)

(58) Field of Classification Search
CPC .... G02B 13/00; G02B 13/04; G02B 13/0045; G02B 13/008; G02B 13/06; G02B 9/62; G02B 9/10; G02B 3/04; G02B 13/18; G02B 15/177; G02B 21/02
USPC ....... 359/713, 658, 382, 752, 756, 740, 755, 359/761, 762
See application file for complete search history.

(56) References Cited

U.S. PATENT DOCUMENTS

| | | | |
|---|---|---|---|
| 10,859,796 | B2 | 12/2020 | Li et al. |
| 2018/0188490 | A1* | 7/2018 | Chang ................. G02B 13/008 |
| 2019/0121064 | A1 | 4/2019 | Zhang et al. |
| 2019/0246016 | A1* | 8/2019 | Chang ................ G02B 13/0045 |
| 2020/0057249 | A1 | 2/2020 | Zhang et al. |

(Continued)

FOREIGN PATENT DOCUMENTS

| | | |
|---|---|---|
| CN | 102645727 A | 8/2012 |
| CN | 106918890 A | 7/2017 |
| CN | 109425968 A | 3/2019 |

(Continued)

OTHER PUBLICATIONS

Office Action for Indian Patent Application No. 202114056503; Jul. 1, 2022.

*Primary Examiner* — Jie Lei
(74) *Attorney, Agent, or Firm* — Barnes & Thornburg LLP

(57) ABSTRACT

The present disclosure discloses an optical imaging lens assembly. The optical imaging lens assembly comprises, sequentially along an optical axis from an object side to an image side, a first lens, having a refractive power; a second lens, having a refractive power, an object-side surface of the second lens being a concave surface; a third lens, having a refractive power, an object-side surface of the third lens being a concave surface; a diaphragm; a fourth lens, having a refractive power; a fifth lens, having a refractive power, an object-side surface of the fifth lens being a concave surface; and a sixth lens, having a refractive power, an image-side surface of the sixth lens being a convex surface. Half of a maximal field-of-view Semi-FOV of the optical imaging lens assembly may satisfy: Semi-FOV$\geq$70°.

20 Claims, 9 Drawing Sheets

(56) References Cited

U.S. PATENT DOCUMENTS

2020/0150384 A1    5/2020  Xu

FOREIGN PATENT DOCUMENTS

| CN | 213659083 U | 7/2021 |
| JP | 2012155223 A | 8/2012 |
| WO | 2020073703 A1 | 4/2020 |

* cited by examiner

OPTICAL IMAGING LENS ASSEMBLY

CROSS-REFERENCE TO RELATED APPLICATIONS

This application claims the priority from Chinese Patent Application No. 202011583348.X, filed in the National Intellectual Property Administration (CNIPA) on Dec. 28, 2021, the contents of which are hereby incorporated by reference in their entirety.

TECHNICAL FIELD

The present disclosure relates to the field of optical element, and specifically to an optical imaging lens assembly.

BACKGROUND

In recent years, with the rapid development of portable electronic products such as a smart phone, the shooting function of the portable electronic products has become one of the main reasons for product upgrading, and users have higher and higher requirements on the imaging quality of an optical imaging lens assembly applied to the smart phone. At present, the trend of replacing a traditional camera with a mobile phone camera is becoming more and more obvious, and the users are becoming more and more interested in mobile phones with a high-quality shooting function.

An optical imaging lens assembly that has a long depth of field and easily produces a sense of perspective and which may enhance the appeal of the picture to make a photographer feel immersive is gradually becoming one of the main development trends in the field of the optical imaging lens assembly applied to the smart phone.

SUMMARY

An aspect of the present disclosure is to provide an optical imaging lens assembly, comprising, sequentially along an optical axis from an object side to an image side: a first lens, having a refractive power; a second lens, having a refractive power, an object-side surface of the second lens being a concave surface; a third lens, having a refractive power, an object-side surface of the third lens being a concave surface; a diaphragm; a fourth lens, having a refractive power; a fifth lens, having a refractive power, an object-side surface of the fifth lens being a concave surface; and a sixth lens, having a refractive power, an image-side surface of the sixth lens being a convex surface. Here, half of a maximal field-of-view Semi-FOV of the optical imaging lens assembly may satisfy: Semi-FOV≥70°, and a distance TTL from an object-side surface of the first lens to an image plane of the optical imaging lens assembly on the optical axis and a total effective focal length f of the optical imaging lens assembly may satisfy: $3.5<TTL/f<5.1$.

According to an implementation of the present disclosure, at least one of the surfaces from the object-side surface of the first lens to the image-side surface of the sixth lens is an aspheric surface.

According to an implementation of the present disclosure, an effective focal length f1 of the first lens and an effective focal length f4 of the fourth lens may satisfy: $-2.5<f1/f4<-1.5$.

According to an implementation of the present disclosure, an effective focal length f3 of the third lens and an effective focal length f5 of the fifth lens may satisfy: $-1.5<f3/f5<-2.5$.

According to an implementation of the present disclosure, a radius of curvature R3 of the object-side surface of the second lens and a radius of curvature R12 of the image-side surface of the sixth lens may satisfy: $3.0<R12/R3<4.5$.

According to an implementation of the present disclosure, a radius of curvature R4 of an image-side surface of the second lens and a radius of curvature R5 of the object-side surface of the third lens may satisfy: $1.0<|R5/R4|<5.0$.

According to an implementation of the present disclosure, a radius of curvature R6 of an image-side surface of the third lens and a radius of curvature R7 of an object-side surface of the fourth lens may satisfy: $-2.0<R6/R7<-1.0$.

According to an implementation of the present disclosure, a radius of curvature R9 of an object-side surface of the fifth lens and a radius of curvature R10 of an image-side surface of the fifth lens may satisfy: $-3.0<R10/R9<-1.0$.

According to an implementation of the present disclosure, a radius of curvature R1 of the object-side surface of the first lens and the total effective focal length f of the optical imaging lens assembly may satisfy: $-2.5<R1/f<-1.0$.

According to an implementation of the present disclosure, a spacing distance T12 between the first lens and the second lens on the optical axis and a center thickness CT1 of the first lens on the optical axis may satisfy: $1.0<T12/CT1<2.0$.

According to an implementation of the present disclosure, a spacing distance T56 between the fifth lens and the sixth lens on the optical axis and a center thickness CT6 of the sixth lens on the optical axis may satisfy: $1.0≤T56/CT6<3.5$.

According to an implementation of the present disclosure, a center thickness CT2 of the second lens on the optical axis and a spacing distance T23 between the second lens and the third lens on the optical axis may satisfy: $2.5<CT2/T23<4.5$.

According to an implementation of the present disclosure, half of a diagonal length ImgH of an effective pixel area on the image plane of the optical imaging lens assembly and the total effective focal length f of the optical imaging lens assembly may satisfy: $1.5<ImgH/f<2.1$.

Another aspect of the present disclosure is to provide an optical imaging lens assembly, comprising, sequentially along an optical axis from an object side to an image side: a first lens, having a refractive power; a second lens, having a refractive power, an object-side surface of the second lens being a concave surface; a third lens, having a refractive power, an object-side surface of the third lens being a concave surface; a diaphragm; a fourth lens, having a refractive power; a fifth lens, having a refractive power, an object-side surface of the fifth lens being a concave surface; and a sixth lens, having a refractive power, an image-side surface of the sixth lens being a convex surface. Here, half of a maximal field-of-view Semi-FOV of the optical imaging lens assembly may satisfy: Semi-FOV≥70°, and a spacing distance T56 between the fifth lens and the sixth lens on the optical axis and a center thickness CT6 of the sixth lens on the optical axis may satisfy: $1.0≤T56/CT6<3.5$.

According to an implementation of the present disclosure, an effective focal length f1 of the first lens and an effective focal length f4 of the fourth lens may satisfy: $-2.5<f1/f4<-1.5$.

According to an implementation of the present disclosure, an effective focal length f3 of the third lens and an effective focal length f5 of the fifth lens may satisfy: $-1.5<f3/f5<-2.5$.

According to an implementation of the present disclosure, a radius of curvature R3 of the object-side surface of the second lens and a radius of curvature R12 of the image-side surface of the sixth lens may satisfy: $3.0<R12/R3<4.5$.

According to an implementation of the present disclosure, a radius of curvature R4 of an image-side surface of the second lens and a radius of curvature R5 of the object-side surface of the third lens may satisfy: 1.0<|R5/R4|<5.0.

According to an implementation of the present disclosure, a radius of curvature R6 of an image-side surface of the third lens and a radius of curvature R7 of an object-side surface of the fourth lens may satisfy: −2.0<R6/R7≤−1.0.

According to an implementation of the present disclosure, a radius of curvature R9 of an object-side surface of the fifth lens and a radius of curvature R10 of an image-side surface of the fifth lens may satisfy: −3.0<R10/R9<−1.0.

According to an implementation of the present disclosure, a radius of curvature R1 of the object-side surface of the first lens and the total effective focal length f of the optical imaging lens assembly may satisfy: −2.5<R1/f<−1.0.

According to an implementation of the present disclosure, a spacing distance T12 between the first lens and the second lens on the optical axis and a center thickness CT1 of the first lens on the optical axis may satisfy: 1.0<T12/CT1<2.0.

According to an implementation of the present disclosure, a center thickness CT2 of the second lens on the optical axis and a spacing distance T23 between the second lens and the third lens on the optical axis may satisfy: 2.5<CT2/T23<4.5.

According to an implementation of the present disclosure, half of a diagonal length ImgH of an effective pixel area on an image plane of the optical imaging lens assembly and the total effective focal length f of the optical imaging lens assembly may satisfy: 1.5<ImgH/f<2.1.

According to an implementation of the present disclosure, a distance TTL from an object-side surface of the first lens to an image plane of the optical imaging lens assembly on the optical axis and a total effective focal length f of the optical imaging lens assembly may satisfy: 3.5<TTL/f<5.1.

According to the present disclosure, by reasonably distributing refractive powers and optimizing optical parameters, an optical imaging lens applicable to a portable electronic product and having at least one of the beneficial effects such as wide angle, small distortion, miniaturization and good imaging quality is provided.

BRIEF DESCRIPTION OF THE DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

Figure 1:
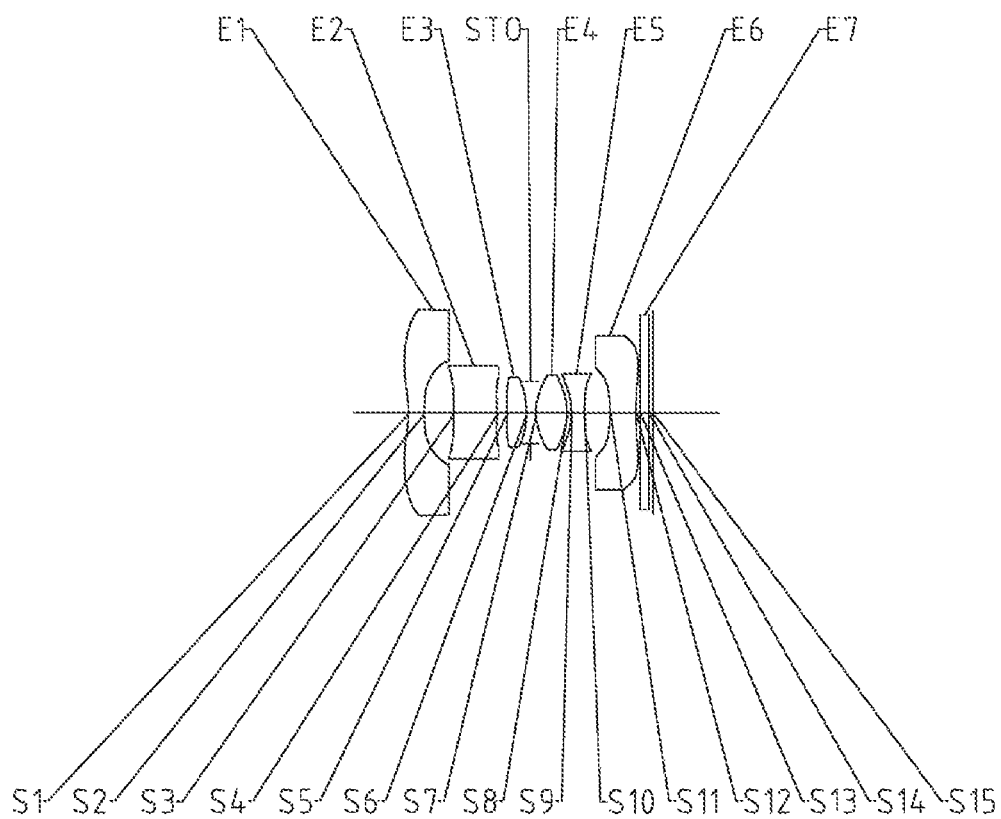
FIG. 1 is a schematic structural diagram of an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure". Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. Embodiments of the present disclosure will be described below in detail with reference to the accompanying drawings.

Features, principles and other aspects of the present disclosure are described below in detail.

An optical imaging lens assembly according to exemplary implementations of the present disclosure may include six lenses having refractive powers, which are respectively a first lens, a second lens, a third lens, a fourth lens, a fifth lens and a sixth lens. The six lenses are arranged in sequence along an optical axis from an object side to an image side. Any two adjacent lenses in the first to sixth lenses may have a spacing distance.

In the exemplary implementations, the first lens may have a positive refractive power or a negative refractive power. The second lens may have a positive refractive power or a negative refractive power, and an object-side surface of the second lens may be a concave surface. The third lens may have a positive refractive power or a negative refractive power, and an object-side surface of the third lens may be a concave surface. The fourth lens may have a positive refractive power or a negative refractive power. The fifth lens may have a positive refractive power or a negative refractive power, and an object-side surface of the fifth lens may be a concave surface. The sixth lens may have a positive refractive power or a negative refractive power, and an image-side surface of the sixth lens may be a convex surface.

In the exemplary implementations, the optical imaging lens assembly further includes a diaphragm disposed between the third lens and the fourth lens. According to exemplary implementations of the present disclosure, the diaphragm is disposed at the middle position of the optical imaging lens assembly, such that the optical imaging lens assembly can be formed in a symmetrical structure, which is conducive to improving the distortion and vertical axis chromatic aberration of the lens assembly and improving the imaging quality. In an example, the first lens may be substantially symmetrical with the sixth lens about the diaphragm, the second lens may be substantially symmetrical with the fifth lens about the diaphragm, and the third lens may be substantially symmetrical with the fourth lens about the diaphragm.

In the exemplary implementations, by reasonably setting the refractive powers and the surface type features of the lenses, the low-order aberration of the optical imaging lens assembly can be effectively balanced, such that the optical imaging lens assembly has a good imaging quality and good processing characteristics. The object-side surfaces of the second lens and the third lens are provided as concave surfaces, which is conducive to being able to better converge light while increasing the field-of-view of the optical imaging lens assembly, thereby improving the image quality of the lens assembly. The concave and convex surfaces of the fifth lens and the sixth lens are reasonably set, which may ensure that the fifth lens and the sixth lens have a good processibility and which makes the structure of the lens assembly more compact.

In the exemplary implementations, the optical imaging lens assembly may satisfy: Semi-FOV≥70°. Here, Semi-FOV is half of a maximal field-of-view of the optical imaging lens assembly. Satisfying Semi-FOV≥70° is conducive to obtaining object information within a larger field.

In the exemplary implementations, the optical imaging lens assembly may satisfy: $-2.5<f1/f4<-1.5$. Here, f1 is an effective focal length of the first lens and f4 is an effective focal length of the fourth lens. More specifically, f1 and f4 may further satisfy: $-2.4<f1/f4<-1.6$. By satisfying $-2.5<f1/f4<-1.5$, the amount of contribution of the first lens and the fourth lens to the field curvature can be reasonably controlled, which is conducive to controlling the field curvature balanced by the first lens and the fourth lens within a reasonable range.

In the exemplary implementations, the optical imaging lens assembly may satisfy: $-1.5<f3/f5<-2.5$. Here, f3 is an effective focal length of the third lens and f5 is an effective focal length of the fifth lens. More specifically, f3 and f5 may further satisfy: $-1.5<f3/f5<-2.1$. By satisfying $-1.5<f3/f5<-2.5$, the deflection angle of light can be reduced to improve the imaging quality of the optical imaging lens assembly.

In the exemplary implementations, the optical imaging lens assembly may satisfy: $3.0<R12/R3<4.5$. Here, R3 is a radius of curvature of the object-side surface of the second lens, and R12 is a radius of curvature of the image-side surface of the sixth lens. More specifically, R12 and R3 may further satisfy: $3.3<R12/R3<4.4$. By satisfying $3.0<R12/R3<4.5$, the axial aberration generated by the optical imaging lens assembly can be effectively balanced.

In the exemplary implementations, the optical imaging lens assembly may satisfy: $1.0<|R5/R4|<5.0$. Here, R4 is a radius of curvature of an image-side surface of the second lens, and R5 is a radius of curvature of an object-side surface of the third lens. Satisfying $1.0<|R5/R4|<5.0$ is conducive to reducing the spherical aberration within a certain range to improve the imaging quality.

In the exemplary implementations, the optical imaging lens assembly may satisfy: $-2.0<R6/R7≤-1.0$. Here, R6 is a radius of curvature of an image-side surface of the third lens, and R7 is a radius of curvature of an object-side surface of the fourth lens. More specifically, R6 and R7 may further satisfy: $-1.8<R6/R7≤-1.0$. Satisfying $-2.0<R6/R7≤-1.0$ can make the optical imaging lens assembly better match the chief ray angle of the chip.

In the exemplary implementations, the optical imaging lens assembly may satisfy: $-3.0<R10/R9<-1.0$. Here, R9 is a radius of curvature of the object-side surface of the fifth lens and R10 is a radius of curvature of an image-side surface of the fifth lens. More specifically, R10 and R9 may further satisfy: $-2.8<R10/R9<-1.3$. By satisfying $-3.0<R10/R9<-1.0$, the amount of distortion of the lens assembly can be controlled within a reasonable range, to ensure that the lens assembly has a good imaging quality.

In the exemplary implementations, the optical imaging lens assembly may satisfy: $-2.5<R1/f<-1.0$. Here, R1 is a radius of curvature of an object-side surface of the first lens, f is a total effective focal length of the optical imaging lens assembly. More specifically, R1 and f may further satisfy: $-2.4<R1/f<-1.1$. By satisfying $-2.5<R1/f<-1.0$, it is possible that the object-side surface of the first lens has sufficient converging power, to adjust the focusing position of light beams, which is conducive to shortening the total track length of the optical imaging lens assembly.

In the exemplary implementations, the optical imaging lens assembly may satisfy: $1.0≤T12/CT1<2.0$. Here, T12 is a spacing distance between the first lens and the second lens on the optical axis, and CT1 is a center thickness of the first lens on the optical axis. Satisfying $1.0≤T12/CT1<2.0$ is conducive to the uniform size distribution of the first lens and the second lens to ensure the assembly stability, and is conducive to reducing the overall aberration of the optical imaging lens assembly and shortening the total track length of the optical imaging lens assembly.

In the exemplary implementations, the optical imaging lens assembly may satisfy: 1.0<T56/CT6<3.5. Here, T56 is a spacing distance between the fifth lens and the sixth lens on the optical axis, and CT6 is a center thickness of the sixth lens on the optical axis. Satisfying 1.0<T56/CT6<3.5 is conducive to the uniform size distribution of the fifth lens and the sixth lens to ensure the assembly stability, and is conducive to reducing the overall aberration of the optical imaging lens assembly and shortening the total track length of the optical imaging lens assembly.

In the exemplary implementations, the optical imaging lens assembly may satisfy: 2.5<CT2/T23<4.5. Here, CT2 is a center thickness of the second lens on the optical axis, and T23 is a spacing distance between the second lens and the third lens on the optical axis. More specifically, CT2 and T23 may further satisfy: 2.9<CT2/T23<4.4. Satisfying 2.5<CT2/T23<4.5 is conducive to the uniform size distribution of the second lens and the third lens to ensure the assembly stability, and is conducive to reducing the overall aberration of the optical imaging lens assembly and shortening the total track length of the optical imaging lens assembly.

In the exemplary implementations, the optical imaging lens assembly may satisfy: 3.5<TTL/f<5.1. Here, TTL is a distance from the object-side surface of the first lens to an image plane of the optical imaging lens assembly on the optical axis, and f is the total effective focal length of the optical imaging lens assembly. More specifically, TTL and f may further satisfy: 3.8<TTL/f<5.1. Satisfying 3.5<TTL/f<5.1 is conducive to ensuring the telephoto characteristic of the optical imaging lens assembly.

In the exemplary implementations, the optical imaging lens assembly may satisfy: 1.5<ImgH/f<2.1. Here, ImgH is half of a diagonal length of an effective pixel area on the image plane of the optical imaging lens assembly, and f is the total effective focal length of the optical imaging lens assembly. By satisfying 1.5<ImgH/f<2.1, the size of the field of view of the optical imaging lens assembly can be effectively controlled.

Alternatively, the above optical imaging lens assembly may further include an optical filter for correcting color deviations and/or a protective glass for protecting a photosensitive element on the image plane.

Implementations of the present disclosure proposes an ultra-wide-angle imaging lens assembly having a diaphragm disposed at the middle of the lens assembly, which can effectively improve the distortion and the vertical axis chromatic aberration so as to achieve a good imaging quality. The optical imaging lens assembly according to the above implementations of the present disclosure may use a plurality of lenses, for example, the above six lenses. By reasonably distributing the refractive powers and the surface types of the lenses, the center thicknesses of the lenses, the axial spacings between the lenses, etc., it is possible to effectively converge the incident light, reduce the total track length of the imaging lens assembly and improve the processability of the imaging lens assembly, which is more conducive to the production and processing of the optical imaging lens assembly.

In implementations of the present disclosure, at least one of the surfaces of the lenses is an aspheric surface. That is, at least one of the surfaces from the object-side surface of the first lens to the image-side surface of the sixth lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens and the sixth lens is an aspheric surface. Alternatively, the object-side surface and the image-side surface of each of the first lens, the second lens, the third lens, the fourth lens, the fifth lens and the sixth lens are aspheric surfaces.

However, it should be understood by those skilled in the art that the various results and advantages described in the present specification may be obtained by changing the number of the lenses constituting the optical imaging lens assembly without departing from the technical solution described in embodiments of the present disclosure. For example, although the optical imaging lens assembly having six lenses is described as an example in the implementations, the optical imaging lens assembly is not limited to having the six lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1 to 2D. FIG. 1 is a schematic structural diagram of the optical imaging lens assembly according to Embodiment 1 of the present disclosure.

As shown in FIG. 1, the optical imaging lens assembly includes, sequentially from an object side to an image side, a first lens E1, a second lens E2, a third lens E3, a diaphragm STO, a fourth lens E4, a fifth lens E5, a sixth lens E6, an optical filter E7 and an image plane S15.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a concave surface, and an image-side surface S4 of the second lens E2 is a convex surface. The third lens E3 has a positive refractive power, an object-side surface S5 of the third lens E3 is a concave surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a convex surface. The optical filter E7 has an object-side surface S13 and an image-side surface 514. Light from an object sequentially passes through the surfaces S1 to S14 and finally forms an image on the image plane S15.

Table 1 is a table showing basic parameters of the optical imaging lens assembly in Embodiment 1. Here, the units of a radius of curvature, a thickness/distance and a focal length are millimeters (mm).

TABLE 1

| surface number | surface type | radius of curvature | thickness/ distance | material refractive index | abbe number | focal length | conic coefficient |
|---|---|---|---|---|---|---|---|
| OBJ | spherical | infinite | 600.0000 | | | | |
| S1 | aspheric | −1.9150 | 0.3679 | 1.55 | 55.9 | −2.90 | −1.1637 |
| S2 | aspheric | 9.6436 | 0.7018 | | | | 36.5467 |
| S3 | aspheric | −20.6079 | 1.0179 | 1.62 | 25.9 | 15.56 | −99.0000 |
| S4 | aspheric | −6.6868 | 0.2375 | | | | 43.1399 |
| S5 | aspheric | −32.2052 | 0.4690 | 1.55 | 55.9 | 4.44 | −99.0000 |
| S6 | aspheric | −2.2655 | 0.1000 | | | | −0.0631 |
| STO | spherical | infinite | 0.1235 | | | | |
| S7 | aspheric | 1.3501 | 0.7420 | 1.55 | 55.9 | 1.45 | −0.4583 |
| S8 | aspheric | −1.5487 | 0.1000 | | | | −0.9615 |
| S9 | aspheric | −2.0710 | 0.3074 | 1.68 | 19.2 | −2.20 | −2.4573 |
| S10 | aspheric | 5.5992 | 0.6106 | | | | 5.9647 |
| S11 | aspheric | −4.7119 | 0.6124 | 1.54 | 55.7 | −9.30 | −19.1878 |
| S12 | aspheric | −88.0000 | 0.1000 | | | | 89.6355 |
| S13 | spherical | infinite | 0.2100 | 1.52 | 64.2 | | |
| S14 | spherical | infinite | 0.1000 | | | | |
| S15 | spherical | infinite | | | | | |

In this example, a total effective focal length f of the optical imaging lens assembly is 1.41 mm, and a total track length TTL of the optical imaging lens assembly (i.e., a distance from the object-side surface S1 of the first lens E1 to the image plane S15 of the optical imaging lens assembly on an optical axis) is 5.80 mm. Half of a diagonal length ImgH of an effective pixel area on the image plane S15 of the optical imaging lens assembly is 2.39 mm. Half of a maximal field-of-view Semi-FOV of the optical imaging lens assembly is 76.1°, and an F-number Fno of the optical imaging lens assembly is 1.80.

In Embodiment 1, both the object-side surface and the image-side surface of any lens in the first to sixth lenses E1 to E6 are aspheric surfaces, and the surface type x of an aspheric lens may be defined using, but not limited to, the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and $A_i$ is the correction coefficient of an i-th order of the aspheric surface. Tables 2-1 and 2-2 below show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1 to S12 in Embodiment 1.

TABLE 2-1

| surface number | $A_4$ | $A_6$ | $A_8$ | $A_{10}$ | $A_{12}$ | $A_{14}$ | $A_{16}$ |
|---|---|---|---|---|---|---|---|
| S1 | 1.5502E+00 | −2.9722E−01 | 1.0024E−01 | −3.6051E−02 | 1.4648E−02 | −6.2085E−03 | 2.7785E−03 |
| S2 | 3.0378E−01 | −2.5726E−02 | 5.6597E−03 | −4.8493E−04 | 2.1253E−04 | 1.0718E−04 | −5.0631E−05 |
| S3 | −6.3270E−02 | −3.8412E−03 | 1.3502E−03 | 1.3337E−04 | −3.1405E−05 | −2.0020E−05 | 1.7441E−06 |
| S4 | 6.6472E−02 | −4.5310E−04 | 9.6020E−04 | 1.1301E−04 | 2.4354E−05 | 5.3584E−07 | 3.4212E−06 |
| S5 | 5.3122E−02 | −8.0016E−03 | 1.4026E−03 | 1.3951E−04 | 6.1404E−05 | 1.2946E−05 | 3.3422E−06 |
| S6 | −1.8086E−02 | −3.4425E−03 | 1.2232E−03 | 5.7359E−05 | 9.2274E−05 | 1.3228E−05 | 9.8862E−06 |
| S7 | −2.5338E−02 | −2.9808E−03 | 8.0080E−04 | 1.1448E−04 | 1.0683E−04 | 7.8209E−06 | 4.6986E−06 |
| S8 | −2.2604E−03 | 1.0379E−03 | 2.0723E−03 | 9.4579E−05 | 2.9936E−04 | 6.0867E−06 | 2.4789E−05 |
| S9 | −3.9472E−02 | 1.1967E−02 | 3.2833E−04 | −7.1010E−04 | 2.7529E−04 | −7.6428E−05 | 4.3305E−05 |
| S10 | 6.3053E−02 | 6.9152E−03 | −9.5017E−04 | −4.9638E−04 | 1.7672E−04 | −4.3084E−05 | 1.3749E−05 |
| S11 | −3.0094E−01 | 2.4553E−02 | 4.3641E−02 | 2.1606E−02 | 4.6616E−03 | −5.8197E−03 | −7.7197E−03 |
| S12 | −1.8152E−01 | −1.5650E−01 | 8.3442E−02 | 2.2229E−02 | 6.0279E−02 | 2.5040E−02 | 2.5109E−02 |

TABLE 2-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −1.2643E−03 | 5.7432E−04 | −2.5498E−04 | 1.1695E−04 | −5.0459E−05 | 1.4575E−05 | −1.8265E−06 |
| S2 | 3.9716E−05 | −1.5583E−05 | 8.4561E−06 | −3.1261E−06 | 4.1291E−06 | −3.0396E−06 | 7.4607E−07 |
| S3 | 1.1088E−06 | −1.4004E−07 | −3.9567E−09 | 0.0000E+00 | 0.0000E+00 | 0.0000E+00 | 0.0000E+00 |
| S4 | −9.5163E−07 | 4.7328E−07 | 0.0000E+00 | 0.0000E+00 | 0.0000E+00 | 0.0000E+00 | 0.0000E+00 |
| S5 | 1.5030E−06 | −6.7273E−07 | 0.0000E+00 | 0.0000E+00 | 0.0000E+00 | 0.0000E+00 | 0.0000E+00 |
| S6 | −1.9306E−07 | 2.9705E−06 | 0.0000E+00 | 0.0000E+00 | 0.0000E+00 | 0.0000E+00 | 0.0000E+00 |
| S7 | −1.7218E−07 | 5.3872E−07 | 0.0000E+00 | 0.0000E+00 | 0.0000E+00 | 0.0000E+00 | 0.0000E+00 |
| S8 | 1.8004E−06 | −7.5548E−07 | 2.4653E−07 | 0.0000E+00 | 0.0000E+00 | 0.0000E+00 | 0.0000E+00 |
| S9 | 1.1045E−05 | 1.9345E−06 | 3.2704E−06 | 7.3371E−07 | 0.0000E+00 | 0.0000E+00 | 0.0000E+00 |

TABLE 2-2-continued

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S10 | −2.5268E−06 | 3.2522E−06 | 0.0000E+00 | 0.0000E+00 | 0.0000E+00 | 0.0000E+00 | 0.0000E+00 |
| S11 | −4.4880E−03 | −7.9658E−04 | 1.8314E−03 | 2.2853E−03 | 1.8271E−03 | 8.8752E−04 | 3.3927E−04 |
| S12 | 9.8370E−03 | 7.2810E−03 | 1.8267E−03 | 1.1114E−03 | −2.7018E−04 | −4.7529E−06 | −1.8578E−04 |

Figures 2A, 2B:
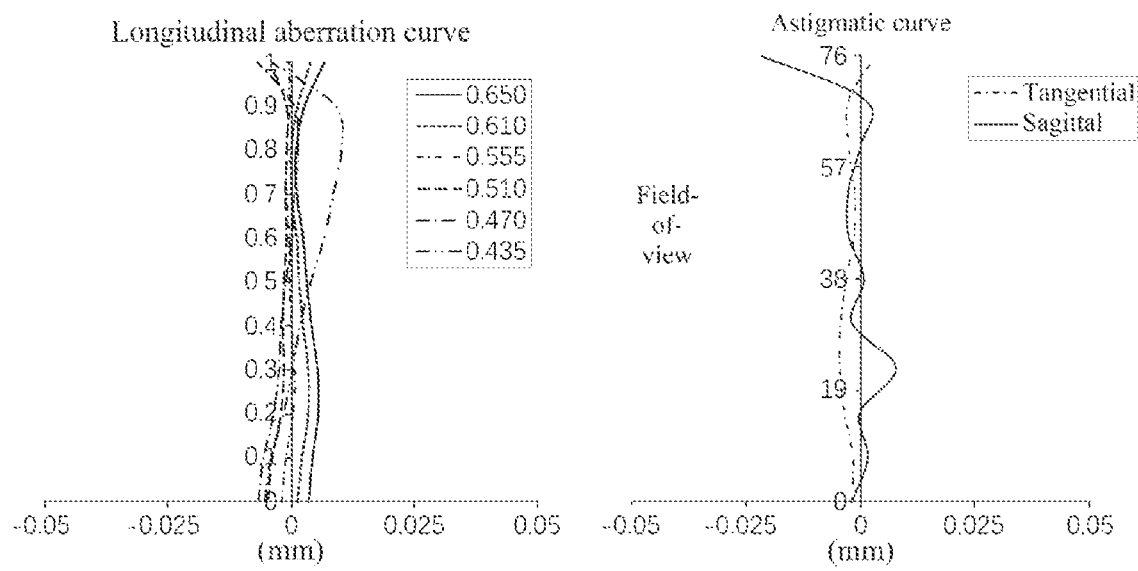
FIGS. 2A to 2D respectively show a longitudinal aberration curve, an astigmatic curve, a distortion curve and a lateral color curve of the optical imaging lens assembly according to Embodiment 1.
Figures 2C, 2D:
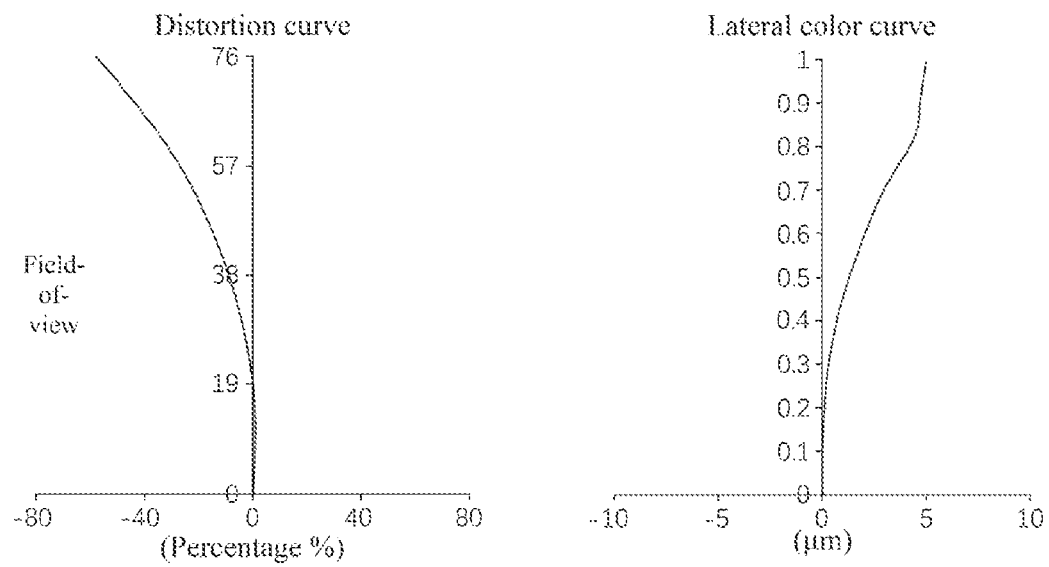

FIG. 2A illustrates a longitudinal aberration curve of the optical imaging lens assembly according to Embodiment 1, representing deviations of focal points of light of different wavelengths converged after passing through the lens assembly. FIG. 2B illustrates an astigmatic curve of the optical imaging lens assembly according to Embodiment 1, representing a curvature of a tangential image plane and a curvature of a sagittal image plane. FIG. 2C illustrates a distortion curve of the optical imaging lens assembly according to Embodiment 1, representing amounts of distortion corresponding to different fields-of-view. FIG. 2D illustrates a lateral color curve of the optical imaging lens assembly according to Embodiment 1, representing deviations of different image heights on the image plane after light passes through the lens assembly. It can be seen from FIGS. 2A to 2D that the optical imaging lens assembly given in Embodiment 1 can achieve a good imaging quality.

Embodiment 2

Figure 3:
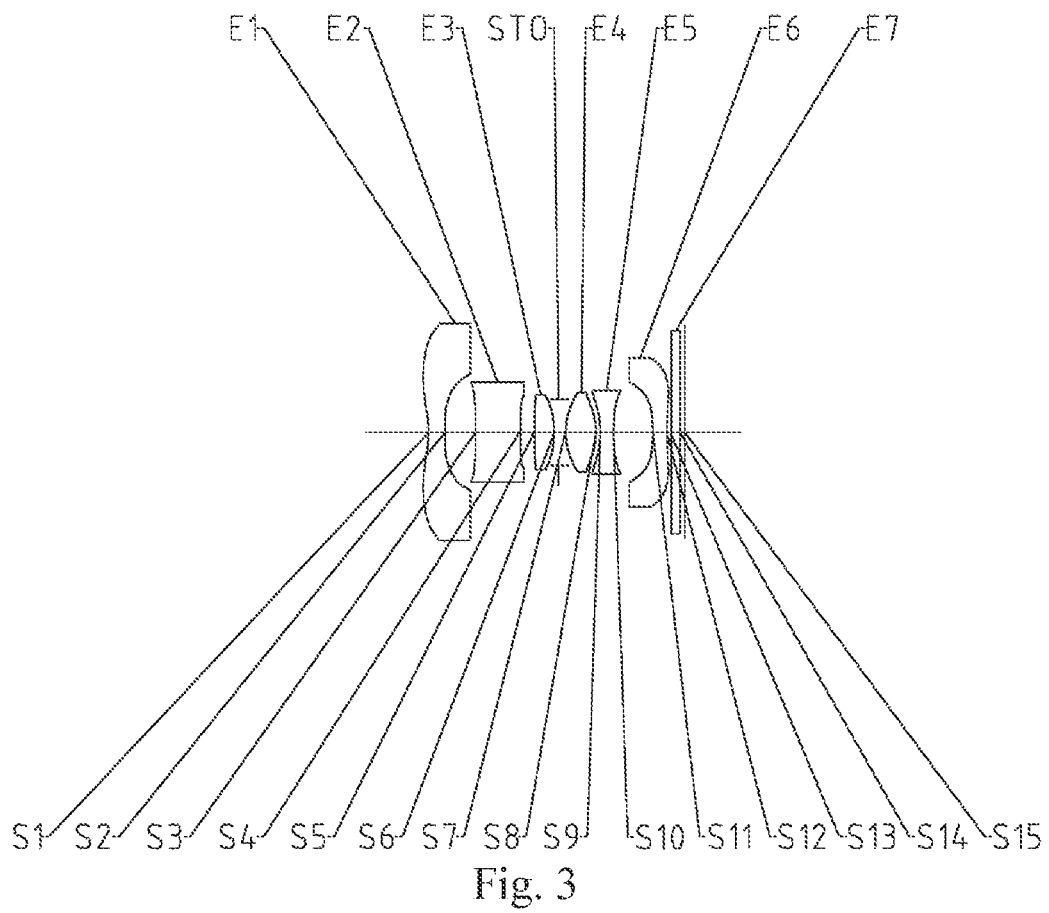
FIG. 3 is a schematic structural diagram of an optical imaging lens assembly according to Embodiment 2 of the present disclosure.

An optical imaging lens assembly according to Embodiment 2 of the present disclosure is described below with reference to FIGS. 3 to 4D. In this embodiment and the following embodiments, for the sake of brevity, some descriptions similar to those in Embodiment 1 will be omitted. FIG. 3 is a schematic structural diagram of the optical imaging lens assembly according to Embodiment 2 of the present disclosure.

As shown in FIG. 3, the optical imaging lens assembly includes, sequentially from an object side to an image side, a first lens E1, a second lens E2, a third lens E3, a diaphragm STO, a fourth lens E4, a fifth lens E5, a sixth lens E6, an optical filter E7 and an image plane S15.

The first lens E1 has a negative refractive power, an object-side surface S1 of the first lens E1 is a concave surface, and an image-side surface S2 of the first lens E1 is a convex surface. The second lens E2 has a positive refractive power, an object-side surface S3 of the second lens E2 is a concave surface, and an image-side surface S4 of the second lens E2 is a convex surface. The third lens E3 has a positive refractive power, an object-side surface S5 of the third lens E3 is a concave surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the surfaces S1 to S14 and finally forms an image on the image plane S15.

In this example, a total effective focal length f of the optical imaging lens assembly is 1.50 mm, and a total track length TTL of the optical imaging lens assembly is 5.80 mm. Half of a diagonal length ImgH of an effective pixel area on the image plane S15 of the optical imaging lens assembly is 2.39 mm. Half of a maximal field-of-view Semi-FOV of the optical imaging lens assembly is 70.8°, and an F-number Fno of the optical imaging lens assembly is 1.80.

Table 3 is a table showing basic parameters of the optical imaging lens assembly in Embodiment 2. Here, the units of a radius of curvature, a thickness/distance and a focal length are millimeters (mm). Tables 4-1 and 4-2 show the high-order coefficients applicable to the aspheric surfaces in Embodiment 2. Here, the surface type of each aspheric surface may be defined using the formula (1) given in Embodiment 1.

TABLE 3

| surface number | surface type | radius of curvature | thickness/ distance | material refractive index | material abbe number | focal length | conic coefficient |
|---|---|---|---|---|---|---|---|
| OBJ | spherical | infinite | 600.0000 | | | | |
| S1 | aspheric | −1.7401 | 0.3700 | 1.55 | 55.9 | −3.40 | −1.3485 |
| S2 | aspheric | −30.0000 | 0.6938 | | | | −99.0000 |
| S3 | aspheric | −25.9461 | 1.0240 | 1.62 | 25.9 | 27.68 | −76.4195 |
| S4 | aspheric | −10.4731 | 0.3030 | | | | 80.3858 |
| S5 | aspheric | −32.2052 | 0.4511 | 1.55 | 55.9 | 4.03 | −70.0386 |
| S6 | aspheric | −2.0680 | 0.1000 | | | | −0.3967 |
| STO | spherical | infinite | 0.1601 | | | | |
| S7 | aspheric | 1.5180 | 0.6850 | 1.55 | 55.9 | 1.55 | −0.2681 |
| S8 | aspheric | −1.6080 | 0.1000 | | | | −1.0194 |
| S9 | aspheric | −2.2985 | 0.3000 | 1.68 | 19.2 | −2.42 | −4.7843 |
| S10 | aspheric | 5.9746 | 0.8920 | | | | 6.9532 |
| S11 | aspheric | −3.8668 | 0.3109 | 1.54 | 55.7 | −7.55 | 3.2480 |
| S12 | aspheric | −88.0000 | 0.1000 | | | | −46.6163 |
| S13 | spherical | infinite | 0.2100 | 1.52 | 64.2 | | |
| S14 | spherical | infinite | 0.1000 | | | | |
| S15 | spherical | infinite | | | | | |

TABLE 4-1

| surface number | $A_4$ | $A_6$ | $A_8$ | $A_{10}$ | $A_{12}$ | $A_{14}$ | $A_{16}$ |
|---|---|---|---|---|---|---|---|
| S1 | 1.5927E+00 | −3.0507E−01 | 1.0135E−01 | −3.4232E−02 | 1.3677E−02 | −5.7135E−03 | 2.6207E−03 |
| S2 | 35665E−01 | −2.8011E−02 | 6.3869E−03 | −1.0016E−03 | 4.4253E−04 | −1.8984E−05 | −7.1974E−06 |
| S3 | −5.1915E−02 | −5.7668E−03 | 1.2332E−03 | 1.3397E−04 | 1.5202E−05 | −4.0036E−05 | 1.1688E−05 |
| S4 | 6.0828E−02 | 2.9518E−04 | 7.5555E−04 | 1.2654E−04 | 2.9491E−05 | 1.7429E−06 | 2.9758E−06 |
| S5 | 4.2467E−02 | −6.8681E−03 | 1.6882E−03 | 3.2935E−04 | 1.0959E−04 | 2.5973E−05 | 6.7885E−06 |
| S6 | −1.6844E−02 | −3.8689E−03 | 1.1134E−03 | 6.5057E−05 | 8.1220E−05 | 1.4755E−05 | 8.0166E−06 |
| S7 | −1.8411E−02 | −2.4736E−03 | 1.2383E−03 | 2.1326E−04 | 1.0983E−04 | 1.8839E−05 | 7.0114E−06 |
| S8 | −1.0819E−03 | 1.8615E−03 | 1.2753E−03 | 1.9622E−04 | 1.5983E−04 | 3.5278E−05 | 1.4140E−05 |
| S9 | −3.1766E−02 | 1.3302E−02 | −3.6597E−04 | 2.5667E−04 | 3.8315E−04 | −1.0328E−05 | −2.1140E−05 |
| S10 | 5.1607E−02 | 4.6752E−03 | −9.5880E−04 | −2.5829E−04 | 1.0037E−04 | −3.0660E−05 | 1.8326E−05 |
| S11 | −4.0734E−01 | 4.3127E−02 | 8.3160E−03 | 3.9166E−02 | 1.5331E−02 | −9.6187E−03 | −1.4065E−02 |
| S12 | −1.7766E−01 | −1.2810E−01 | 3.7373E−02 | −2.6116E−02 | 1.6032E−02 | −7.4921E−03 | 5.0703E−03 |

TABLE 4-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −1.2294E−03 | 5.8867E−04 | −2.8076E−04 | 1.3039E−04 | −5.0360E−05 | 1.2514E−05 | −1.3683E−06 |
| S2 | 2.3912E−05 | −1.2716E−05 | 3.6311E−06 | −2.0254E−06 | 4.9795E−06 | −3.0815E−06 | 6.0367E−07 |
| S3 | −5.1403E−06 | 2.3122E−06 | −4.7240E−07 | 0.0000E+00 | 0.0000E+00 | 0.0000E+00 | 0.0000E+00 |
| S4 | −7.3271E−07 | 4.9727E−07 | 0.0000E+00 | 0.0000E+00 | 0.0000E+00 | 0.0000E+00 | 0.0000E+00 |
| S5 | −5.2651E−08 | −9.2088E−07 | 0.0000E+00 | 0.0000E+00 | 0.0000E+00 | 0.0000E+00 | 0.0000E+00 |
| S6 | −5.3543E−08 | 2.2147E−06 | 0.0000E+00 | 0.0000E+00 | 0.0000E+00 | 0.0000E+00 | 0.0000E+00 |
| S7 | 2.8404E−06 | −7.1290E−07 | 4.2828E−07 | −8.2942E−07 | −1.4050E−07 | −6.0455E−07 | 5.9146E−07 |
| S8 | 8.7362E−06 | 1.0381E−06 | 7.2151E−07 | 0.0000E+00 | 0.0000E+00 | 0.0000E+00 | 0.0000E+00 |
| S9 | −2.7408E−05 | −1.3257E−05 | 3.2704E−06 | 7.3371E−07 | 0.0000E+00 | 0.0000E+00 | 0.0000E+00 |
| S10 | −1.0396E−05 | 9.3395E−06 | −6.3014E−06 | 3.4727E−06 | −2.5467E−06 | 1.6233E−06 | −4.3200E−07 |
| S11 | −1.2408E−02 | −5.9848E−03 | −1.2321E−03 | 1.1679E−03 | 1.4625E−03 | 9.2461E−04 | 3.0374E−04 |
| S12 | −2.3706E−03 | 1.4805E−03 | −5.5973E−04 | 3.4463E−04 | −2.4252E−04 | 1.7709E−04 | −6.2422E−05 |

Figure 4A:
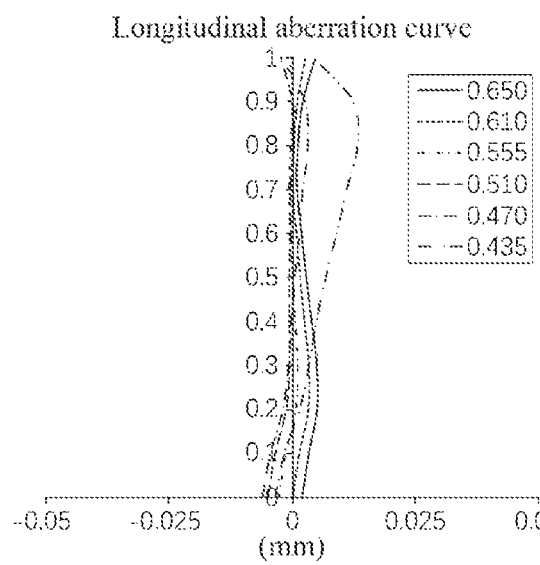
FIGS. 4A to 4D respectively show a longitudinal aberration curve, an astigmatic curve, a distortion curve and a lateral color curve of the optical imaging lens assembly according to Embodiment 2.
Figure 4B:
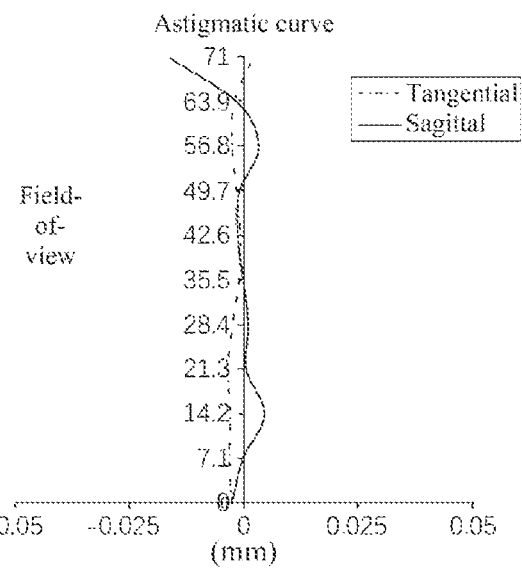
Figure 4C:
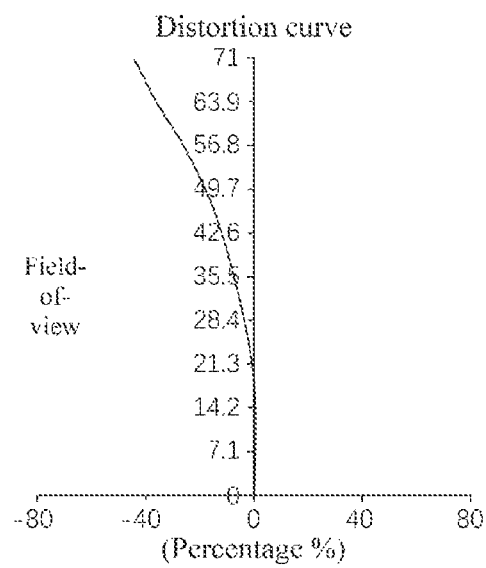
Figure 4D:
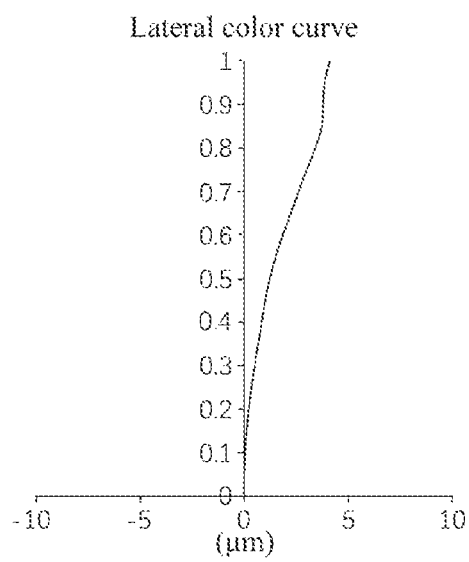

FIG. 4A illustrates a longitudinal aberration curve of the optical imaging lens assembly according to Embodiment 2, representing deviations of focal points of light of different wavelengths converged after passing through the lens assembly. FIG. 4B illustrates an astigmatic curve of the optical imaging lens assembly according to Embodiment 2, representing a curvature of a tangential image plane and a curvature of a sagittal image plane. FIG. 4C illustrates a distortion curve of the optical imaging lens assembly according to Embodiment 2, representing amounts of distortion corresponding to different fields-of-view. FIG. 4D illustrates a lateral color curve of the optical imaging lens assembly according to Embodiment 2, representing deviations of different image heights on the image plane after light passes through the lens assembly. It can be seen from FIGS. 4A to 4D that the optical imaging lens assembly given in Embodiment 2 can achieve a good imaging quality.

Embodiment 3

Figure 5:
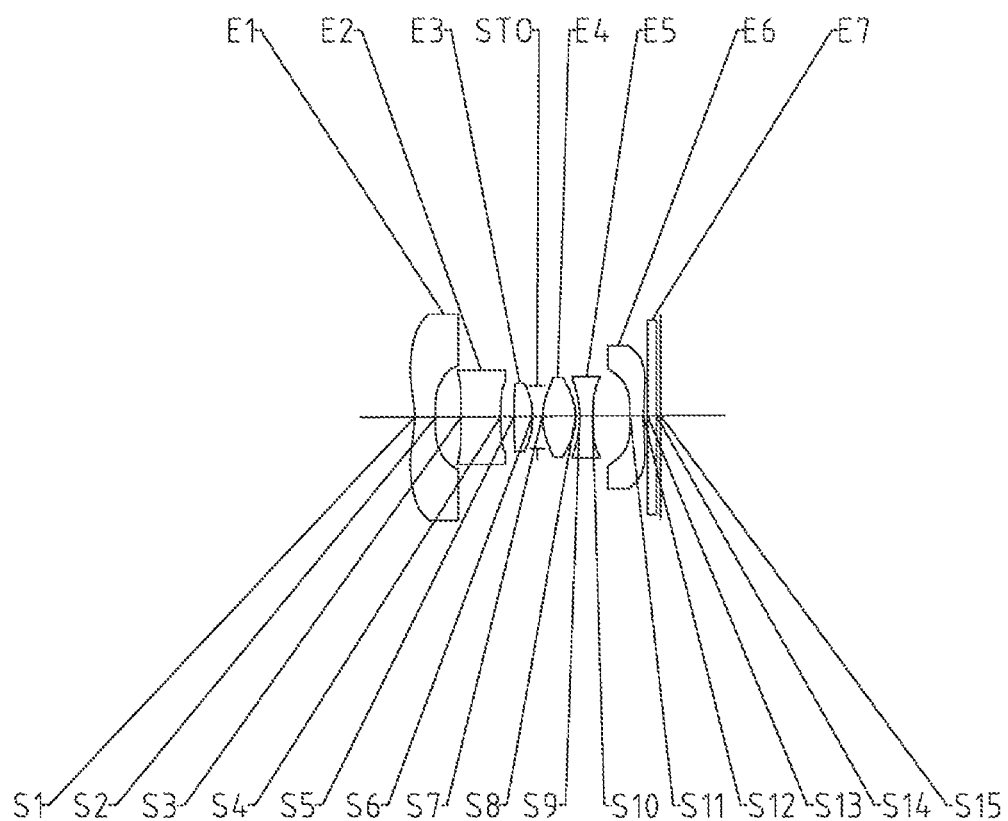
FIG. 5 is a schematic structural diagram of an optical imaging lens assembly according to Embodiment 3 of the present disclosure.

An optical imaging lens assembly according to Embodiment 3 of the present disclosure is described below with reference to FIGS. 5 to 6D. FIG. 5 is a schematic structural diagram of the optical imaging lens assembly according to Embodiment 3 of the present disclosure.

As shown in FIG. 5, the optical imaging lens assembly includes, sequentially from an object side to an image side, a first lens E1, a second lens E2, a third lens E3, a diaphragm STO, a fourth lens E4, a fifth lens E5, a sixth lens E6, an optical filter E7 and an image plane S15.

The first lens E1 has a negative refractive power, an object-side surface S1 of the first lens E1 is a concave surface, and an image-side surface S2 of the first lens E1 is a convex surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the surfaces S1 to S14 and finally forms an image on the image plane S15.

In this example, a total effective focal length f of the optical imaging lens assembly is 1.45 mm, and a total track length TTL of the optical imaging lens assembly is 5.80 mm. Half of a diagonal length ImgH of an effective pixel area on the image plane S15 of the optical imaging lens assembly is 2.39 mm. Half of a maximal field-of-view Semi-FOV of the optical imaging lens assembly is 70.8°, and an F-number Fno of the optical imaging lens assembly is 1.80.

Table 5 is a table showing basic parameters of the optical imaging lens assembly in Embodiment 3. Here, the units of a radius of curvature, a thickness/distance and a focal length are millimeters (mm). Tables 6-1 and 6-2 show the high-order coefficients applicable to the aspheric surfaces in Embodiment 3. Here, the surface type of each aspheric surface may be defined using the formula (1) given in Embodiment 1.

TABLE 5

| surface number | surface type | radius of curvature | thickness/ distance | material refractive index | abbe number | focal length | conic coefficient |
|---|---|---|---|---|---|---|---|
| OBJ | spherical | infinite | 600.0000 | | | | |
| S1 | aspheric | −1.7786 | 0.4818 | 1.55 | 55.9 | −3.49 | −1.3690 |
| S2 | aspheric | −30.0000 | 0.6096 | | | | 90.0000 |
| S3 | aspheric | −25.9461 | 0.9335 | 1.62 | 25.9 | −22.34 | −99.0000 |
| S4 | aspheric | 30.0000 | 0.3165 | | | | 85.8177 |
| S5 | aspheric | −32.2052 | 0.4374 | 1.55 | 55.9 | 3.57 | 90.0000 |
| S6 | aspheric | −1.8438 | 0.1000 | | | | −0.5786 |
| STO | spherical | infinite | 0.1341 | | | | |
| S7 | aspheric | 1.5644 | 0.7814 | 1.55 | 55.9 | 1.48 | −0.2990 |
| S8 | aspheric | −1.3758 | 0.1000 | | | | −1.1706 |
| S9 | aspheric | −2.6784 | 0.3000 | 1.68 | 19.2 | −2.24 | −2.5393 |
| S10 | aspheric | 3.6629 | 0.8827 | | | | −29.3666 |
| S11 | aspheric | −6.0397 | 0.3132 | 1.54 | 55.7 | −12.10 | 17.1900 |
| S12 | aspheric | −88.0000 | 0.1000 | | | | −99.0000 |
| S13 | spherical | infinite | 0.2100 | 1.52 | 64.2 | | |
| S14 | spherical | infinite | 0.1000 | | | | |
| S15 | spherical | infinite | | | | | |

TABLE 6-1

| surface number | $A_4$ | $A_6$ | $A_8$ | $A_{10}$ | $A_{12}$ | $A_{14}$ | $A_{16}$ |
|---|---|---|---|---|---|---|---|
| S1 | 1.5864E+00 | −3.1165E−01 | 1.0503E−01 | −3.5394E−02 | 1.3912E−02 | −5.6951E−03 | 2.5711E−03 |
| S2 | 3.3929E−01 | −2.7671E−02 | 5.0896E−03 | −5.9089E−04 | 3.1057E−04 | 9.2983E−06 | −1.3047E−05 |
| S3 | −4.4814E−02 | −8.4247E−03 | 2.4431E−03 | −5.3643E−05 | 2.2687E−05 | −5.4872E−05 | 2.0009E−05 |
| S4 | 5.4551E−02 | 1.9606E−03 | 1.5725E−03 | 3.0926E−04 | 8.4421E−05 | 2.0443E−05 | 9.3129E−06 |
| S5 | 3.2435E−02 | −4.7687E−03 | 3.0745E−03 | 8.3438E−04 | 2.6223E−04 | 6.1497E−05 | 5.7842E−06 |
| S6 | −1.5614E−02 | −5.1834E−03 | 1.5775E−03 | 1.6511E−04 | 1.5177E−04 | 3.7440E−05 | 1.9257E−05 |
| S7 | −1.8468E−02 | −6.2107E−03 | 7.1874E−04 | −4.0490E−05 | 7.0703E−05 | −2.7786E−06 | 2.3681E−06 |
| S8 | 1.3860E−03 | −2.0086E−03 | 8.0621E−04 | −1.0542E−06 | 6.4492E−05 | 3.0170E−06 | 1.8759E−06 |
| S9 | −3.7568E−02 | 1.7245E−02 | −7.8825E−04 | −2.4684E−04 | 3.3432E−05 | −4.8400E−06 | 1.1402E−05 |
| S10 | 4.2525E−02 | 9.8041E−03 | −1.0146E−03 | −1.9840E−04 | 4.9486E−05 | −3.6656E−05 | 1.9144E−05 |
| S11 | −4.4949E−01 | 4.1536E−02 | 7.4268E−02 | 3.8823E−02 | 1.8725E−02 | −6.9057E−03 | −1.4452E−02 |
| S12 | −1.9028E−01 | −1.3197E−01 | 4.0864E−02 | −2.7770E−02 | 1.8322E−02 | −8.1474E−03 | 5.9291E−03 |

TABLE 6-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −1.1896E−03 | 5.7269E−04 | −2.8236E−04 | 1.3451E−04 | −5.0644E−05 | 1.1767E−05 | −1.1762E−06 |
| S2 | 2.6597E−05 | −1.5175E−05 | 4.0153E−06 | −1.7443E−06 | 4.8997E−06 | −3.1443E−06 | 6.2589E−07 |
| S3 | −6.7654E−06 | 2.3128E−06 | −3.7897E−07 | 0.0000E+00 | 0.0000E+00 | 0.0000E+00 | 0.0000E+00 |
| S4 | 1.2965E−06 | 1.3790E−06 | 0.0000E+00 | 0.0000E+00 | 0.0000E+00 | 0.0000E+00 | 0.0000E+00 |
| S5 | −5.0825E−06 | −4.5343E−06 | 0.0000E+00 | 0.0000E+00 | 0.0000E+00 | 0.0000E+00 | 0.0000E+00 |
| S6 | 3.4515E−06 | 4.9199E−06 | 0.0000E+00 | 0.0000E+00 | 0.0000E+00 | 0.0000E+00 | 0.0000E+00 |
| S7 | 9.5340E−07 | −2.4071E−07 | 2.3638E−07 | −1.9664E−08 | 4.6705E−07 | −4.1785E−07 | 9.1100E−08 |
| S8 | 3.4788E−06 | −1.2811E−06 | 9.0678E−07 | 0.0000E+00 | 0.0000E+00 | 0.0000E+00 | 0.0000E+00 |
| S9 | 5.2642E−06 | −2.9425E−06 | 1.6410E−06 | 4.4663E−07 | 0.0000E+00 | 0.0000E+00 | 0.0000E+00 |
| S10 | −1.3130E−05 | 1.1227E−05 | −6.8991E−06 | 4.4037E−06 | −3.0420E−06 | 1.3163E−06 | −2.2513E−07 |
| S11 | −1.5109E−02 | −9.8567E−03 | −4.4909E−03 | −9.9038E−04 | 4.7457E−04 | 6.2323E−04 | 3.6928E−04 |
| S12 | −2.5408E−03 | 1.6452E−03 | −6.5017E−04 | 4.3659E−04 | −2.9239E−04 | 1.9517E−04 | −7.8742E−05 |

Figures 6A, 6B:
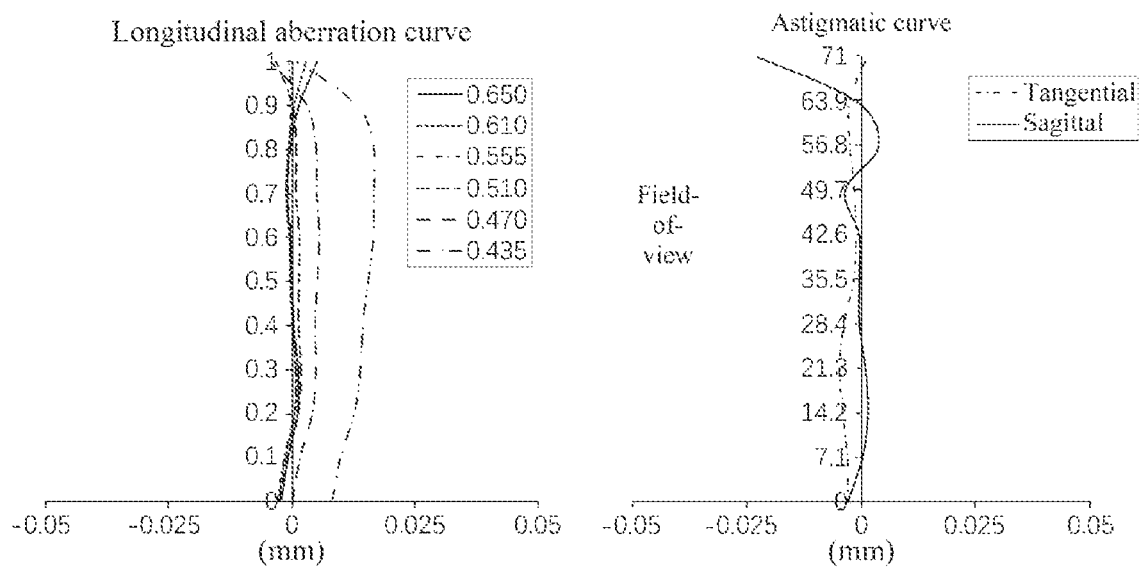
FIGS. 6A to 6D respectively show a longitudinal aberration curve, an astigmatic curve, a distortion curve and a lateral color curve of the optical imaging lens assembly according to Embodiment 3.
Figures 6C, 6D:
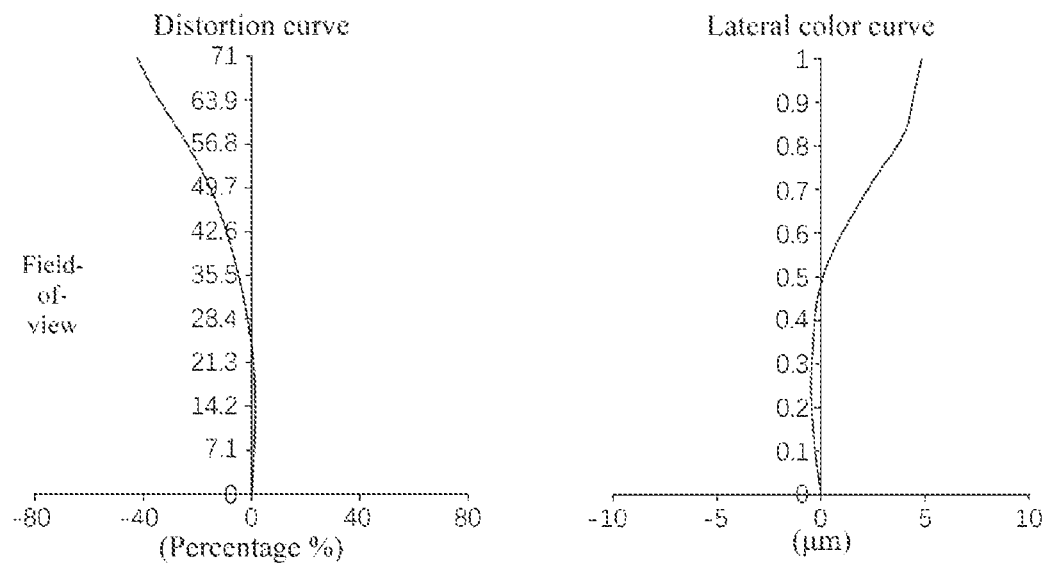

FIG. 6A illustrates a longitudinal aberration curve of the optical imaging lens assembly according to Embodiment 3, representing deviations of focal points of light of different wavelengths converged after passing through the lens assembly. FIG. 6B illustrates an astigmatic curve of the optical imaging lens assembly according to Embodiment 3, representing a curvature of a tangential image plane and a curvature of a sagittal image plane. FIG. 6C illustrates a distortion curve of the optical imaging lens assembly according to Embodiment 3, representing amounts of distortion corresponding to different fields-of-view. FIG. 6D illustrates a lateral color curve of the optical imaging lens assembly according to Embodiment 3, representing deviations of different image heights on the image plane after light passes through the lens assembly. It can be seen from FIGS. 6A to 6D that the optical imaging lens assembly given in Embodiment 3 can achieve a good imaging quality.

Embodiment 4

Figure 7:
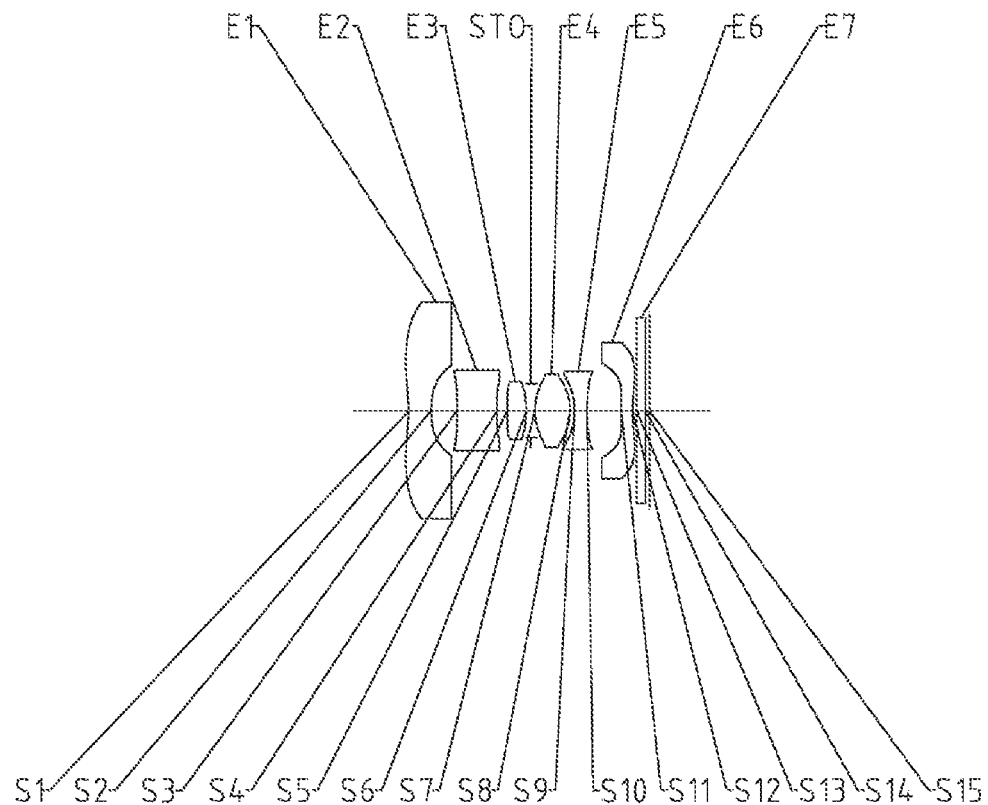
FIG. 7 is a schematic structural diagram of an optical imaging lens assembly according to Embodiment 4 of the present disclosure.

An optical imaging lens assembly according to Embodiment 4 of the present disclosure is described below with reference to FIGS. 7 to 8D. FIG. 7 is a schematic structural diagram of the optical imaging lens assembly according to Embodiment 4 of the present disclosure.

As shown in FIG. 7, the optical imaging lens assembly includes, sequentially from an object side to an image side, a first lens E1, a second lens E2, a third lens E3, a diaphragm STO, a fourth lens E4, a fifth lens E5, a sixth lens E6, an optical filter E7 and an image plane S15.

The first lens E1 has a negative refractive power, an object-side surface S1 of the first lens E1 is a concave surface, and an image-side surface S2 of the first lens E1 is a concave surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a concave surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The optical filter E7 has an object-side surface S13 and an image-side surface S14. Light from an object sequentially passes through the surfaces S1 to S14 and finally forms an image on the image plane S15.

In this example, a total effective focal length f of the optical imaging lens assembly is 1.24 mm, and a total track length TTL of the optical imaging lens assembly is 5.80 mm. Half of a diagonal length ImgH of an effective pixel area on the image plane S15 of the optical imaging lens assembly is 2.39 mm. Half of a maximal field-of-view Semi-FOV of the optical imaging lens assembly is 80.9°, and an F-number Fno of the optical imaging lens assembly is 1.85.

Table 7 is a table showing basic parameters of the optical imaging lens assembly in Embodiment 4. Here, the units of a radius of curvature, a thickness/distance and a focal length are millimeters (mm). Tables 8-1 and 8-2 show the high-order coefficients applicable to the aspheric surfaces in Embodiment 4. Here, the surface type of each aspheric surface may be defined using the formula (1) given in Embodiment 1.

TABLE 7

| surface number | surface type | radius of curvature | thickness/ distance | refractive index | abbe number | focal length | conic coefficient |
|---|---|---|---|---|---|---|---|
| OBJ | spherical | infinite | 600.0000 | | | | |
| S1 | aspheric | −2.4987 | 0.5336 | 1.55 | 55.9 | −2.45 | −1.0362 |
| S2 | aspheric | 3.1028 | 0.6247 | | | | 6.7898 |
| S3 | aspheric | −20.6079 | 0.9630 | 1.62 | 25.9 | −206.87 | 23.6437 |
| S4 | aspheric | −25.0000 | 0.2512 | | | | −27.9401 |
| S5 | aspheric | −32.2052 | 0.4628 | 1.55 | 55.9 | 3.61 | −99.0000 |
| S6 | aspheric | −1.8635 | 0.1000 | | | | −1.9040 |
| STO | spherical | infinite | 0.1000 | | | | |
| S7 | aspheric | 1.4865 | 0.8527 | 1.55 | 55.9 | 1.41 | −0.1210 |
| S8 | aspheric | −1.2644 | 0.1000 | | | | −1.1650 |
| S9 | aspheric | −2.4081 | 0.3000 | 1.68 | 19.2 | −2.03 | 2.4194 |
| S10 | aspheric | 3.3539 | 0.8355 | | | | −64.9787 |
| S11 | aspheric | 26.9963 | 0.2666 | 1.54 | 55.7 | 38.53 | 55.2786 |
| S12 | aspheric | −88.0000 | 0.1000 | | | | −99.0000 |
| S13 | spherical | infinite | 0.2100 | 1.52 | 64.2 | | |
| S14 | spherical | infinite | 0.1000 | | | | |
| S15 | spherical | infinite | | | | | |

TABLE 8-1

| surface number | $A_4$ | $A_6$ | $A_8$ | $A_{10}$ | $A_{12}$ | $A_{14}$ | $A_{16}$ |
|---|---|---|---|---|---|---|---|
| S1 | 1.5211E+00 | −2.7802E−01 | 9.6755E−02 | −3.6292E−02 | 1.5095E−02 | −6.3902E−03 | 2.8166E−03 |
| S2 | 2.1546E−01 | −3.7190E−02 | 6.6394E−03 | 2.5274E−03 | 3.1908E−03 | 2.6482E−03 | 1.9988E−03 |
| S3 | −6.5582E−02 | −3.9957E−03 | 2.1406E−03 | 3.7270E−05 | −6.3120E−05 | −2.5030E−05 | 7.4579E−06 |
| S4 | 7.0022E−02 | 2.2501E−03 | 1.8819E−03 | 5.0141E−04 | 1.4892E−04 | 4.1628E−05 | 1.3644E−05 |
| S5 | 5.2597E−02 | −3.5166E−03 | 2.1255E−03 | 4.4334E−04 | 1.1301E−04 | 1.4790E−05 | 2.3778E−06 |
| S6 | −4.6667E−03 | −2.3166E−03 | 2.4775E−03 | 5.1241E−04 | 3.1464E−04 | 1.1682E−04 | 6.4305E−05 |
| S7 | −1.4112E−01 | −7.5272E−03 | 1.7714E−03 | −7.0427E−04 | 1.9233E−04 | 4.6541E−06 | 2.4521E−05 |
| S8 | 3.3237E−03 | −2.7657E−03 | 2.9039E−03 | −4.0157E−04 | 1.1125E−04 | −3.3157E−05 | 2.5743E−05 |
| S9 | −8.4070E−02 | 1.6268E−02 | 1.4380E−03 | −8.8387E−04 | −1.1622E−04 | −3.7775E−05 | 8.3814E−06 |
| S10 | 3.1546E−02 | 1.3146E−02 | −2.7481E−04 | −5.7806E−04 | 5.1395E−05 | −6.8028E−05 | 1.7052E−05 |
| S11 | −3.6330E−01 | −2.7435E−02 | 7.7756E−03 | −5.6846E−03 | 2.1516E−03 | −4.9091E−04 | 3.2313E−04 |
| S12 | −2.0785E−01 | −1.3623E−01 | 7.6229E−02 | −2.3887E−02 | 3.0651E−02 | −1.1882E−02 | 5.4858E−03 |

TABLE 8-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −1.2698E−03 | 5.8011E−04 | −2.6458E−04 | 1.2260E−04 | −5.0173E−05 | 1.3327E−05 | −1.5373E−06 |
| S2 | 1.4313E−03 | 9.1768E−04 | 5.5956E−04 | 3.0016E−04 | 1.4716E−04 | 6.0737E−05 | 2.3768E−05 |
| S3 | −3.8945E−06 | 3.3804E−06 | −3.2315E−06 | 0.0000E+00 | 0.0000E+00 | 0.0000E+00 | 0.0000E+00 |
| S4 | 3.0879E−06 | 5.7195E−07 | 0.0000E+00 | 0.0000E+00 | 0.0000E+00 | 0.0000E+00 | 0.0000E+00 |
| S5 | −8.2341E−07 | −4.9331E−07 | 0.0000E+00 | 0.0000E+00 | 0.0000E+00 | 0.0000E+00 | 0.0000E+00 |
| S6 | 2.4938E−05 | 1.1932E−05 | 0.0000E+00 | 0.0000E+00 | 0.0000E+00 | 0.0000E+00 | 0.0000E+00 |

TABLE 8-2-continued

| surface number | $A_{18}$ | $A_{20}$ | $A_{22}$ | $A_{24}$ | $A_{26}$ | $A_{28}$ | $A_{30}$ |
| --- | --- | --- | --- | --- | --- | --- | --- |
| S7 | 8.0091E−06 | 3.1135E−06 | 0.0000E+00 | 0.0000E+00 | 0.0000E+00 | 0.0000E+00 | 0.0000E+00 |
| S8 | 1.3453E−06 | 1.3328E−05 | 4.7238E−06 | 0.0000E+00 | 0.0000E+00 | 0.0000E+00 | 0.0000E+00 |
| S9 | −8.5894E−06 | −1.0154E−06 | 3.2704E−06 | 7.3371E−07 | 0.0000E+00 | 0.0000E+00 | 0.0000E+00 |
| S10 | −6.8288E−06 | 3.0503E−06 | 0.0000E+00 | 0.0000E+00 | 0.0000E+00 | 0.0000E+00 | 0.0000E+00 |
| S11 | 1.5005E−04 | −4.5352E−05 | 2.4438E−05 | −2.4818E−05 | 7.1046E−05 | −5.2162E−05 | 1.0408E−05 |
| S12 | −6.2654E−03 | 7.6543E−04 | −1.9700E−03 | −7.8938E−05 | −4.6857E−04 | 6.3450E−05 | −2.8821E−04 |

Figure 8A:
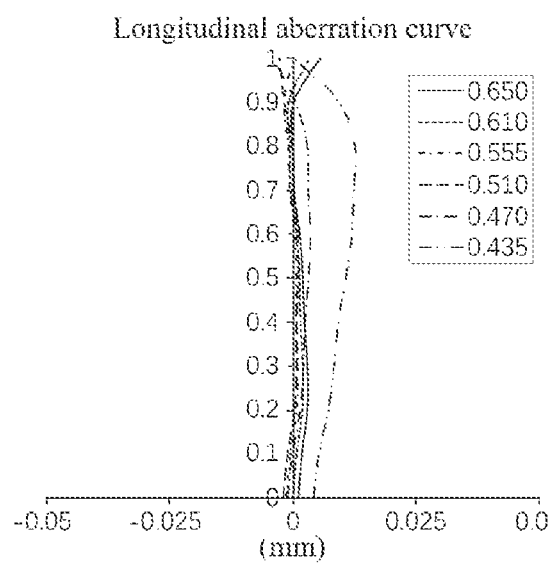
FIGS. 8A to 8D respectively show a longitudinal aberration curve, an astigmatic curve, a distortion curve and a lateral color curve of the optical imaging lens assembly according to Embodiment 4.
Figure 8B:
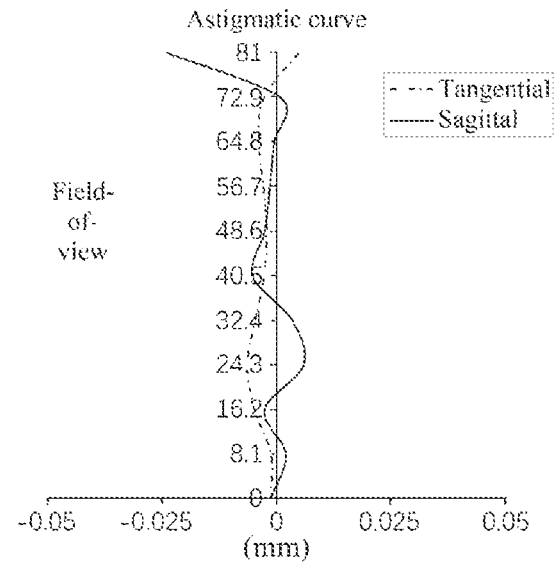
Figure 8C:
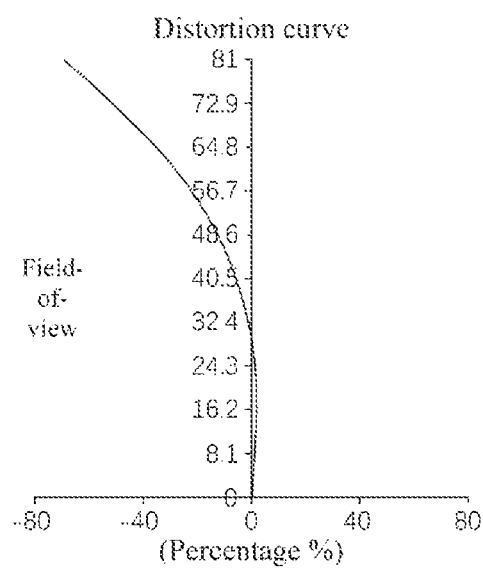
Figure 8D:
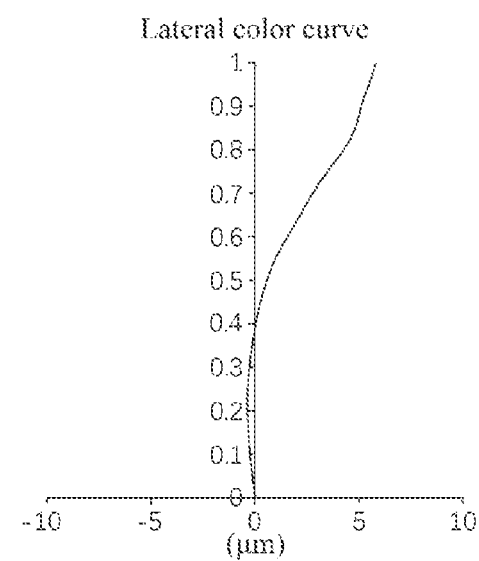

FIG. 8A illustrates a longitudinal aberration curve of the optical imaging lens assembly according to Embodiment 4, representing deviations of focal points of light of different wavelengths converged after passing through the lens assembly. FIG. 8B illustrates an astigmatic curve of the optical imaging lens assembly according to Embodiment 4, representing a curvature of a tangential image plane and a curvature of a sagittal image plane. FIG. 8C illustrates a distortion curve of the optical imaging lens assembly according to Embodiment 4, representing amounts of distortion corresponding to different fields-of-view. FIG. 8D illustrates a lateral color curve of the optical imaging lens assembly according to Embodiment 4, representing deviations of different image heights on the image plane after light passes through the lens assembly. It can be seen from FIGS. 8A to 8D that the optical imaging lens assembly given in Embodiment 4 can achieve a good imaging quality.

Embodiment 5

Figure 9:
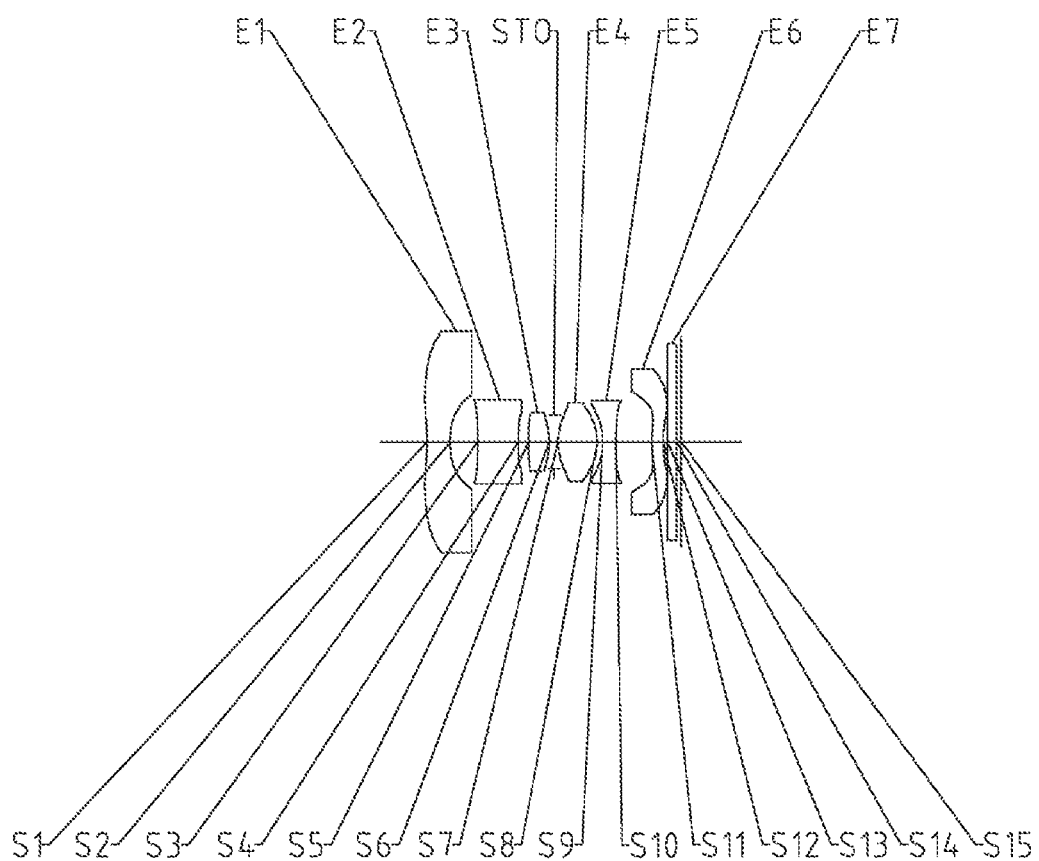
FIG. 9 is a schematic structural diagram of an optical imaging lens assembly according to Embodiment 5 of the present disclosure.

An optical imaging lens assembly according to Embodiment 5 of the present disclosure is described below with reference to FIGS. 9 to 10D. FIG. 9 is a schematic structural diagram of the optical imaging lens assembly according to Embodiment 5 of the present disclosure.

As shown in FIG. 9, the optical imaging lens assembly includes, sequentially from an object side to an image side, a first lens E1, a second lens E2, a third lens E3, a diaphragm STO, a fourth lens E4, a fifth lens E5, a sixth lens E6, an optical filter E7 and an image plane S15.

The first lens E1 has a negative refractive power, an object-side surface S1 of the first lens E1 is a concave surface, and an image-side surface S2 of the first lens E1 is a concave surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The optical filter E7 has an object-side surface S13 and an image-side surface S14. Light from an object sequentially passes through the surfaces S1 to S14 and finally forms an image on the image plane S15.

In this example, a total effective focal length f of the optical imaging lens assembly is 1.15 mm, and a total track length TTL of the optical imaging lens assembly is 5.80 mm. Half of a diagonal length ImgH of an effective pixel area on the image plane S15 of the optical imaging lens assembly is 2.39 mm. Half of a maximal field-of-view Semi-FOV of the optical imaging lens assembly is 81.0°, and an F-number Fno of the optical imaging lens assembly is 1.85.

Table 9 is a table showing basic parameters of the optical imaging lens assembly in Embodiment 5. Here, the units of a radius of curvature, a thickness/distance and a focal length are millimeters (mm). Tables 10-1 and 10-2 show the high-order coefficients applicable to the aspheric surfaces in Embodiment 5. Here, the surface type of each aspheric surface may be defined using the formula (1) given in Embodiment 1.

TABLE 9

| surface number | surface type | radius of curvature | thickness/ distance | material refractive index | abbe number | focal length | conic coefficient |
| --- | --- | --- | --- | --- | --- | --- | --- |
| OBJ | spherical | infinite | 600.0000 | | | | |
| S1 | aspheric | −2.6107 | 0.5177 | 1.55 | 55.9 | −2.41 | −0.7827 |
| S2 | aspheric | 2.8336 | 0.6317 | | | | 5.6306 |
| S3 | aspheric | −20.6079 | 0.9291 | 1.62 | 25.9 | −16.26 | 67.2421 |
| S4 | aspheric | 20.0000 | 0.2371 | | | | 90.0000 |
| S5 | aspheric | −32.2052 | 0.4714 | 1.55 | 55.9 | 3.25 | −99.0000 |
| S6 | aspheric | −1.6891 | 0.1000 | | | | −2.7494 |
| STO | spherical | infinite | 0.1000 | | | | |
| S7 | aspheric | 1.5347 | 0.8962 | 1.55 | 55.9 | 1.39 | −0.1524 |
| S8 | aspheric | −1.1834 | 0.1244 | | | | −1.0747 |
| S9 | aspheric | −2.2366 | 0.3000 | 1.68 | 19.2 | −1.89 | 2.2113 |
| S10 | aspheric | 3.1468 | 0.8185 | | | | −91.1422 |
| S11 | aspheric | 2.8325 | 0.2641 | 1.54 | 55.7 | 5.12 | −27.1476 |
| S12 | aspheric | −88.0000 | 0.1000 | | | | −99.0000 |
| S13 | spherical | infinite | 0.2100 | 1.52 | 64.2 | | |
| S14 | spherical | infinite | 0.1000 | | | | |
| S15 | spherical | infinite | | | | | |

TABLE 10-1

| surface number | $A_4$ | $A_6$ | $A_8$ | $A_{10}$ | $A_{12}$ | $A_{14}$ | $A_{16}$ |
|---|---|---|---|---|---|---|---|
| S1 | 1.4573E+00 | −2.6595E−01 | 9.6636E−02 | −3.7412E−02 | 1.5569E−02 | −6.4905E−03 | 2.8183E−03 |
| S2 | 2.0711E−01 | −3.6950E−02 | 9.5111E−03 | 3.3701E−03 | 3.5922E−03 | 2.9140E−03 | 2.2083E−03 |
| S3 | −6.5487E−02 | −4.3736E−03 | 2.4096E−03 | 5.9360E−05 | −8.6358E−05 | −1.9832E−05 | 4.4734E−06 |
| S4 | 7.3509E−02 | 4.9686E−03 | 3.3296E−03 | 1.1447E−03 | 3.6791E−04 | 1.2071E−04 | 3.5645E−05 |
| S5 | 5.6964E−02 | −2.0544E−05 | 2.9221E−03 | 6.4301E−04 | 1.1976E−04 | 9.3223E−06 | −6.3552E−07 |
| S6 | −3.1273E−04 | −6.8989E−04 | 2.6393E−03 | 7.1357E−04 | 4.0123E−04 | 1.6948E−04 | 8.5256E−05 |
| S7 | −1.4390E−02 | −1.0412E−02 | 1.6944E−03 | −2.1542E−04 | 1.7223E−04 | 6.9398E−06 | 3.8471E−05 |
| S8 | −1.2541E−03 | −3.4979E−03 | 2.8613E−03 | −5.1166E−04 | −1.7691E−04 | 2.6200E−05 | 3.1263E−05 |
| S9 | −8.8093E−02 | 2.4104E−02 | 1.1788E−03 | −5.2740E−04 | −5.0221E−04 | 6.5196E−05 | −3.1483E−07 |
| S10 | 1.8419E−02 | 1.6694E−02 | −1.2417E−05 | −2.8897E−04 | −5.7351E−05 | −8.1881E−05 | 1.2197E−05 |
| S11 | −4.3003E−01 | −3.6866E−02 | 1.8716E−02 | −1.0796E−02 | 3.2835E−03 | −8.2153E−04 | 2.9742E−04 |
| S12 | −1.7656E−01 | −1.5504E−01 | 1.0456E−01 | −4.5844E−02 | 4.4760E−02 | −2.1173E−02 | 1.1058E−02 |

TABLE 10-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −1.2741E−03 | 5.8729E−04 | −2.6750E−04 | 1.2287E−04 | −4.9675E−05 | 1.2963E−05 | −1.4633E−06 |
| S2 | 1.6054E−03 | 1.0464E−03 | 6.6071E−04 | 3.6978E−04 | 1.9332E−04 | 8.0554E−05 | 3.8389E−05 |
| S3 | −4.7111E−06 | 2.4987E−06 | −3.2868E−06 | 0.0000E+00 | 0.0000E+00 | 0.0000E+00 | 0.0000E+00 |
| S4 | 1.0699E−05 | 1.8176E−06 | 0.0000E+00 | 0.0000E+00 | 0.0000E+00 | 0.0000E+00 | 0.0000E+00 |
| S5 | −1.6170E−06 | −1.9102E−06 | 0.0000E+00 | 0.0000E+00 | 0.0000E+00 | 0.0000E+00 | 0.0000E+00 |
| S6 | 3.1546E−05 | 1.2056E−05 | 0.0000E+00 | 0.0000E+00 | 0.0000E+00 | 0.0000E+00 | 0.0000E+00 |
| S7 | 1.2863E−05 | 3.8987E−06 | 0.0000E+00 | 0.0000E+00 | 0.0000E+00 | 0.0000E+00 | 0.0000E+00 |
| S8 | 3.8000E−05 | 2.5599E−05 | 7.3136E−06 | 0.0000E+00 | 0.0000E+00 | 0.0000E+00 | 0.0000E+00 |
| S9 | 7.6066E−07 | −4.0451E−06 | 3.2704E−06 | 7.3371E−07 | 0.0000E+00 | 0.0000E+00 | 0.0000E+00 |
| S10 | −1.1645E−05 | 5.7017E−06 | 0.0000E+00 | 0.0000E+00 | 0.0000E+00 | 0.0000E+00 | 0.0000E+00 |
| S11 | 1.8724E−04 | −3.7752E−05 | 2.7181E−05 | −2.5787E−05 | 7.2322E−05 | −5.2411E−05 | 1.0237E−05 |
| S12 | −8.3156E−03 | 2.7168E−03 | −2.0947E−03 | 4.0385E−04 | −4.2663E−04 | 8.1864E−05 | −2.5877E−04 |

Figures 10A, 10B:
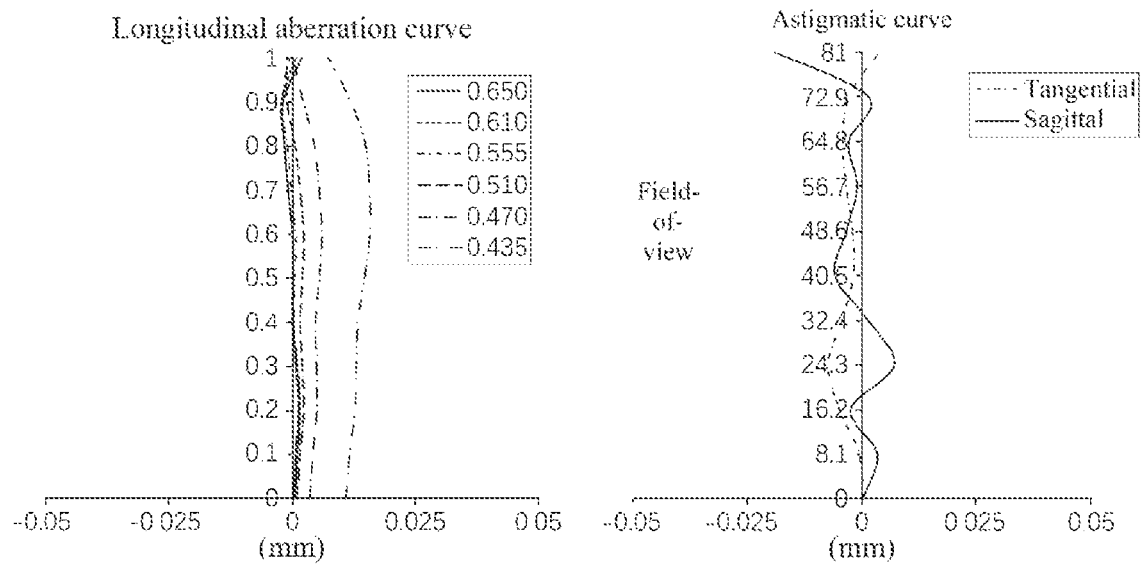
FIGS. 10A to 10D respectively show a longitudinal aberration curve, an astigmatic curve, a distortion curve and a lateral color curve of the optical imaging lens assembly according to Embodiment 5.
Figures 10C, 10D:
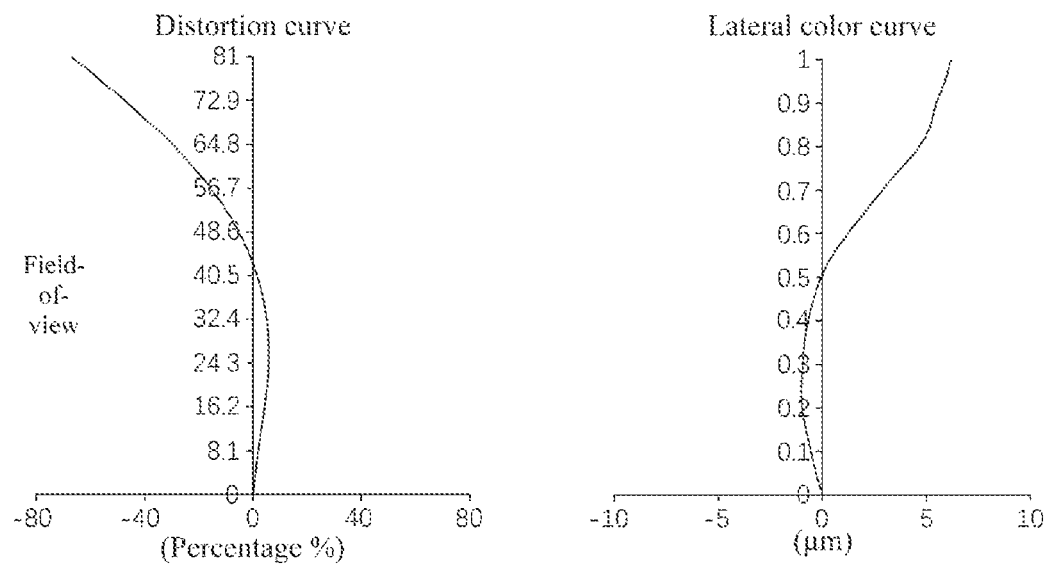

FIG. 10A illustrates a longitudinal aberration curve of the optical imaging lens assembly according to Embodiment 5, representing deviations of focal points of light of different wavelengths converged after passing through the lens assembly. FIG. 10B illustrates an astigmatic curve of the optical imaging lens assembly according to Embodiment 5, representing a curvature of a tangential image plane and a curvature of a sagittal image plane. FIG. 10C illustrates a distortion curve of the optical imaging lens assembly according to Embodiment 5, representing amounts of distortion corresponding to different fields-of-view. FIG. 10D illustrates a lateral color curve of the optical imaging lens assembly according to Embodiment 5, representing deviations of different image heights on the image plane after light passes through the lens assembly. It can be seen from FIGS. 10A to 10D that the optical imaging lens assembly given in Embodiment 5 can achieve a good imaging quality.

Embodiment 6

Figure 11:
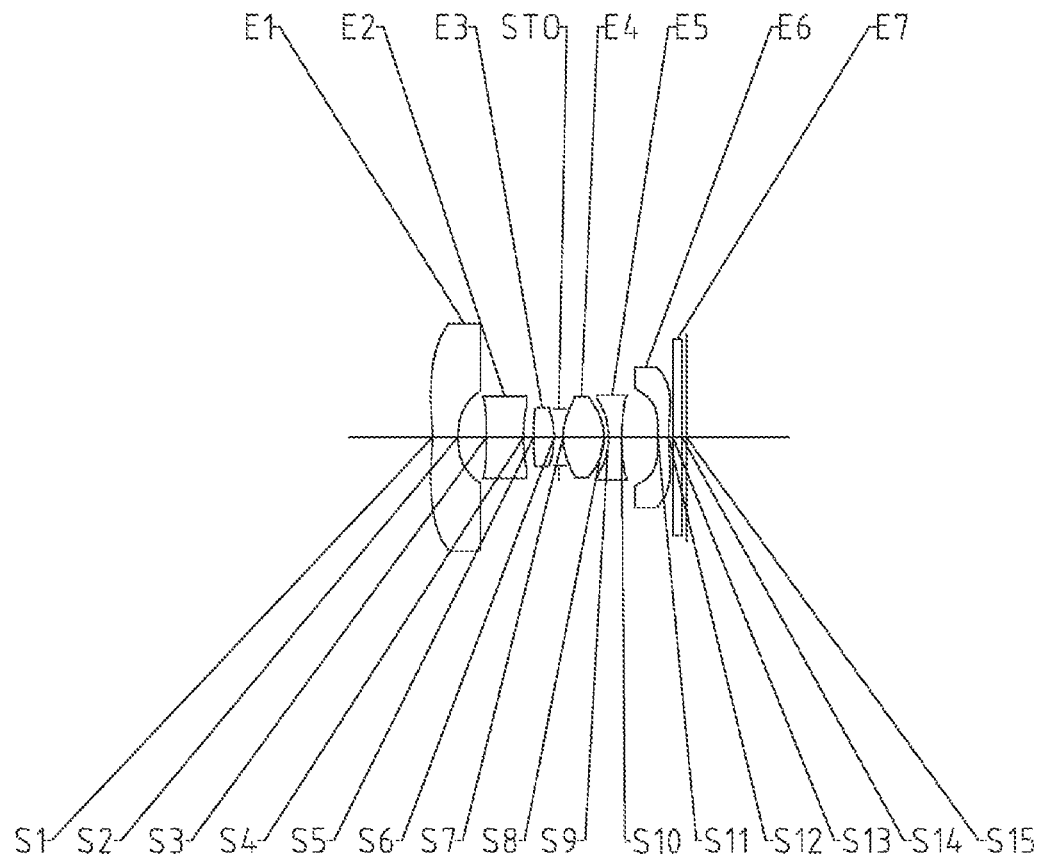
FIG. 11 is a schematic structural diagram of an optical imaging lens assembly according to Embodiment 6 of the present disclosure.

An optical imaging lens assembly according to Embodiment 6 of the present disclosure is described below with reference to FIGS. 11 to 12D. FIG. 11 is a schematic structural diagram of the optical imaging lens assembly according to Embodiment 6 of the present disclosure.

As shown in FIG. 11, the optical imaging lens assembly includes, sequentially from an object side to an image side, a first lens E1, a second lens E2, a third lens E3, a diaphragm STO, a fourth lens E4, a fifth lens E5, a sixth lens E6, an optical filter E7 and an image plane S15.

The first lens E1 has a negative refractive power, an object-side surface S1 of the first lens E1 is a concave surface, and an image-side surface S2 of the first lens E1 is a concave surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the surfaces S1 to S14 and finally forms an image on the image plane S15.

In this example, a total effective focal length f of the optical imaging lens assembly is 1.23 mm, and a total track length TTL of the optical imaging lens assembly is 5.80 mm. Half of a diagonal length ImgH of an effective pixel area on the image plane S15 of the optical imaging lens assembly is 2.39 mm. Half of a maximal field-of-view Semi-FOV of the optical imaging lens assembly is 81.0°, and an F-number Fno of the optical imaging lens assembly is 1.85.

Table 11 is a table showing basic parameters of the optical imaging lens assembly in Embodiment 6. Here, the units of a radius of curvature, a thickness/distance and a focal length are millimeters (mm). Tables 12-1 and 12-2 show the high-order coefficients applicable to the aspheric surfaces in Embodiment 6. Here, the surface type of each aspheric surface may be defined using the formula (1) given in Embodiment 1.

TABLE 11

| surface number | surface type | radius of curvature | thickness/ distance | material refractive index | abbe number | focal length | conic coefficient |
|---|---|---|---|---|---|---|---|
| OBJ | spherical | infinite | 600.0000 | | | | |
| S1 | aspheric | −2.8736 | 0.5780 | 1.55 | 55.9 | −2.38 | −0.7255 |
| S2 | aspheric | 2.5457 | 0.6488 | | | | 4.1652 |
| S3 | aspheric | −20.6079 | 0.8497 | 1.62 | 25.9 | −19.61 | 78.1783 |
| S4 | aspheric | 30.0000 | 0.2272 | | | | 90.0000 |
| S5 | aspheric | −32.2052 | 0.4776 | 1.55 | 55.9 | 3.39 | −94.8368 |
| S6 | aspheric | −1.7591 | 0.1000 | | | | −3.0191 |
| STO | spherical | infinite | 0.1000 | | | | |
| S7 | aspheric | 1.5136 | 0.9386 | 1.55 | 55.9 | 1.36 | −0.1454 |
| S8 | aspheric | −1.1344 | 0.1000 | | | | −1.2055 |
| S9 | aspheric | −2.4166 | 0.3000 | 1.68 | 19.2 | −2.03 | 2.6215 |
| S10 | aspheric | 3.3571 | 0.8262 | | | | −50.8695 |
| S11 | aspheric | −20.0000 | 0.2438 | 1.54 | 55.7 | −48.30 | −57.1609 |
| S12 | aspheric | −88.0000 | 0.1000 | | | | −99.0000 |
| S13 | spherical | infinite | 0.2100 | 1.52 | 64.2 | | |
| S14 | spherical | infinite | 0.1000 | | | | |
| S15 | spherical | infinite | | | | | |

TABLE 12-1

| surface number | $A_4$ | $A_6$ | $A_8$ | $A_{10}$ | $A_{12}$ | $A_{14}$ | $A_{16}$ |
|---|---|---|---|---|---|---|---|
| S1 | 1.4511E+00 | −2.7024E−01 | 9.9504E−02 | −3.8148E−02 | 1.5615E−02 | −6.4742E−03 | 2.8253E−03 |
| S2 | 2.1469E−01 | −3.1851E−02 | 9.3109E−03 | 4.6706E−03 | 3.3654E−03 | 2.4902E−03 | 1.5003E−03 |
| S3 | −6.6318E−02 | −6.9836E−03 | 3.6830E−03 | −7.8997E−05 | −1.3557E−04 | −2.3540E−05 | 2.4651E−05 |
| S4 | 7.3257E−02 | 1.2361E−03 | 2.7559E−03 | 7.4312E−04 | 1.7869E−04 | 2.4413E−05 | −1.9666E−06 |
| S5 | 5.9408E−02 | −2.9098E−03 | 2.4789E−03 | 4.8621E−04 | 7.8693E−05 | −4.6251E−06 | −6.0822E−06 |
| S6 | 9.2205E−04 | −1.1180E−03 | 2.7507E−03 | 6.2178E−04 | 3.3387E−04 | 1.1647E−04 | 6.0442E−05 |
| S7 | −1.4595E−02 | −9.4248E−03 | 1.8696E−03 | −3.7428E−05 | 1.9803E−04 | −1.7281E−05 | 5.1712E−06 |
| S8 | 4.4405E−03 | −6.9274E−03 | 4.3959E−03 | −8.2930E−04 | 4.0506E−04 | −9.1320E−05 | 4.6482E−05 |
| S9 | −9.3750E−02 | 2.1586E−02 | 5.6678E−03 | −2.3529E−03 | 6.1656E−05 | −7.2960E−05 | 4.4036E−05 |
| S10 | 1.0270E−02 | 1.4514E−02 | 1.9931E−03 | −8.9141E−04 | 1.1686E−04 | −1.3194E−04 | 2.3929E−05 |
| S11 | −3.3947E−01 | −2.6447E−02 | 1.6509E−03 | −4.5169E−03 | 1.1963E−03 | −1.2836E−04 | 1.9166E−04 |
| S12 | −2.4861E−01 | −1.0134E−01 | 6.0512E−02 | −1.2487E−02 | 2.2298E−02 | −8.4576E−03 | 3.2884E−03 |

TABLE 12-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −1.2805E−03 | 5.8636E−04 | −2.6634E−04 | 1.2354E−04 | −5.0015E−05 | 1.2841E−05 | −1.4120E−06 |
| S2 | 1.1068E−03 | 6.1501E−04 | 4.3069E−04 | 2.1065E−04 | 1.3680E−04 | 4.7743E−05 | 3.8737E−05 |
| S3 | −2.1642E−06 | 2.1014E−06 | −5.2455E−07 | 0.0000E+00 | 0.0000E+00 | 0.0000E+00 | 0.0000E+00 |
| S4 | −6.4432E−06 | −1.8728E−06 | 0.0000E+00 | 0.0000E+00 | 0.0000E+00 | 0.0000E+00 | 0.0000E+00 |
| S5 | −1.2313E−06 | −2.3942E−06 | 0.0000E+00 | 0.0000E+00 | 0.0000E+00 | 0.0000E+00 | 0.0000E+00 |
| S6 | 1.9642E−05 | 1.0227E−05 | 0.0000E+00 | 0.0000E+00 | 0.0000E+00 | 0.0000E+00 | 0.0000E+00 |
| S7 | 6.2627E−07 | −9.5629E−08 | 0.0000E+00 | 0.0000E+00 | 0.0000E+00 | 0.0000E+00 | 0.0000E+00 |
| S8 | −1.7683E−05 | 2.3439E−06 | 1.6299E−06 | 0.0000E+00 | 0.0000E+00 | 0.0000E+00 | 0.0000E+00 |
| S9 | −2.4952E−06 | −6.1931E−06 | 3.2704E−06 | 7.3371E−07 | 0.0000E+00 | 0.0000E+00 | 0.0000E+00 |
| S10 | −1.2774E−05 | 4.8106E−06 | 0.0000E+00 | 0.0000E+00 | 0.0000E+00 | 0.0000E+00 | 0.0000E+00 |
| S11 | 1.9930E−04 | −4.7688E−06 | 2.0756E−05 | −2.6456E−05 | 7.1110E−05 | −5.2580E−05 | 1.0377E−05 |
| S12 | −3.9733E−03 | 6.3872E−04 | −9.3841E−04 | −4.3239E−05 | −2.9147E−04 | 2.7806E−05 | −3.0316E−04 |

Figure 12A:
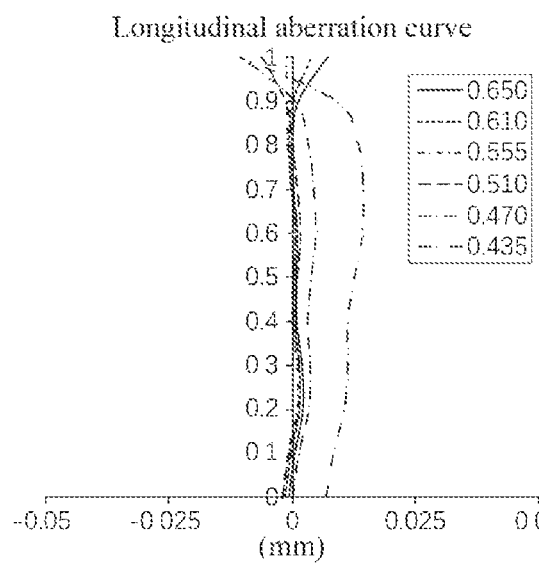
FIGS. 12A to 12D respectively show a longitudinal aberration curve, an astigmatic curve, a distortion curve and a lateral color curve of the optical imaging lens assembly according to Embodiment 6.
Figure 12B:
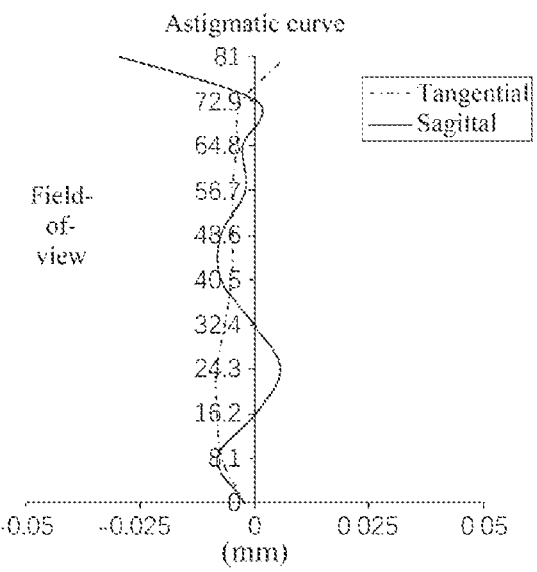
Figure 12C:
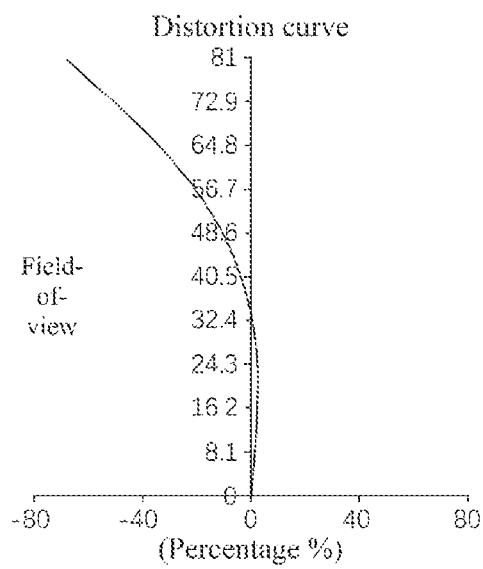
Figure 12D:
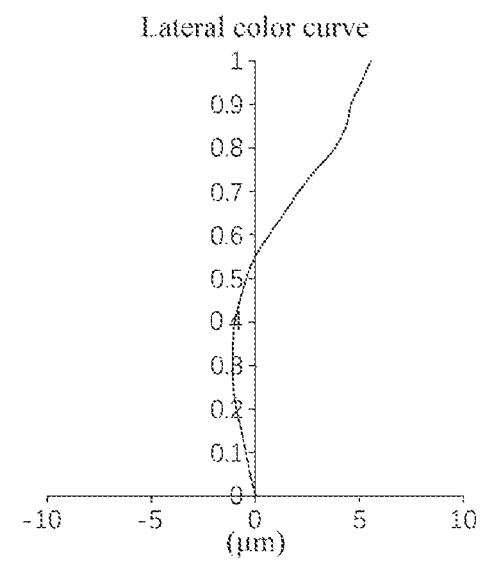

FIG. 12A illustrates a longitudinal aberration curve of the optical imaging lens assembly according to Embodiment 6, representing deviations of focal points of light of different wavelengths converged after passing through the lens assembly. FIG. 12B illustrates an astigmatic curve of the optical imaging lens assembly according to Embodiment 6, representing a curvature of a tangential image plane and a curvature of a sagittal image plane. FIG. 12C illustrates a distortion curve of the optical imaging lens assembly according to Embodiment 6, representing amounts of distortion corresponding to different fields-of-view. FIG. 12D illustrates a lateral color curve of the optical imaging lens assembly according to Embodiment 6, representing deviations of different image heights on the image plane after light passes through the lens assembly. It can be seen from FIGS. 12A to 12D that the optical imaging lens assembly given in Embodiment 6 can achieve a good imaging quality.

In summary, Embodiments 1-6 respectively satisfy the relationships shown in Table 13.

TABLE 13

| | embodiment | | | | | |
|---|---|---|---|---|---|---|
| conditional expression | 1 | 2 | 3 | 4 | 5 | 6 |
| f1/f4 | −1.99 | −2.19 | −2.35 | −1.75 | −1.74 | −1.76 |
| f3/f5 | −2.02 | −1.67 | −1.59 | −1.78 | −1.72 | −1.67 |
| TTL/f | 4.10 | 3.88 | 4.01 | 4.66 | 5.03 | 4.73 |

TABLE 13-continued

| conditional expression | embodiment | | | | | |
|---|---|---|---|---|---|---|
| | 1 | 2 | 3 | 4 | 5 | 6 |
| ImgH/f | 1.69 | 1.60 | 1.65 | 1.92 | 2.07 | 1.95 |
| R12/R3 | 4.27 | 3.39 | 3.39 | 4.27 | 4.27 | 4.27 |
| |R5/R4| | 4.82 | 3.08 | 1.07 | 1.29 | 1.61 | 1.07 |
| R6/R7 | −1.68 | −1.36 | −1.18 | −1.25 | −1.10 | −1.16 |
| R10/R9 | −2.70 | −2.60 | −1.37 | −1.39 | −1.41 | −1.39 |
| R1/f | −1.35 | −1.16 | −1.23 | −2.01 | −2.26 | −2.34 |
| T12/CT1 | 1.91 | 1.88 | 1.27 | 1.17 | 1.22 | 1.12 |
| T56/CT6 | 1.00 | 2.87 | 2.82 | 3.13 | 3.10 | 3.39 |
| CT2/T23 | 4.29 | 3.38 | 2.95 | 3.83 | 3.92 | 3.74 |

An Embodiment of the present disclosure further provides an imaging apparatus having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in embodiments of the present disclosure with (but not limited to) technical features with similar functions.

What is claimed is:

1. An optical imaging lens assembly, comprising, sequentially along an optical axis from an object side to an image side:
    a first lens having a refractive power;
    a second lens having a refractive power, an object-side surface of the second lens being a concave surface;
    a third lens having a refractive power, an object-side surface of the third lens being a concave surface at the optical axis;
    a diaphragm;
    a fourth lens having a refractive power;
    a fifth lens having a negative refractive power, an object-side surface of the fifth lens being a concave surface; and
    a sixth lens having a negative refractive power, an image-side surface of the sixth lens being a convex surface at the optical axis,
    wherein half of a maximal field-of-view Semi-FOV of the optical imaging lens assembly satisfies: Semi-FOV≥70°, and
    a distance TTL from an object-side surface of the first lens to an image plane of the optical imaging lens assembly on the optical axis and a total effective focal length f of the optical imaging lens assembly satisfy: 3.5<TTL/f<5.1.

2. The optical imaging lens assembly according to claim 1, wherein an effective focal length f1 of the first lens and an effective focal length f4 of the fourth lens satisfy: −2.5<f1/f4<−1.5.

3. The optical imaging lens assembly according to claim 1, wherein an effective focal length f3 of the third lens and an effective focal length f5 of the fifth lens satisfy: −2.5<f3/f5<−1.5.

4. The optical imaging lens assembly according to claim 1, wherein a radius of curvature R3 of the object-side surface of the second lens and a radius of curvature R12 of the image-side surface of the sixth lens satisfy: 3.0<R12/R3<4.5.

5. The optical imaging lens assembly according to claim 1, wherein a radius of curvature R4 of an image-side surface of the second lens and a radius of curvature R5 of the object-side surface of the third lens satisfy: 1.0<|R5/R4|<5.0.

6. The optical imaging lens assembly according to claim 1, wherein a radius of curvature R6 of an image-side surface of the third lens and a radius of curvature R7 of an object-side surface of the fourth lens satisfy: −2.0<R6/R7 ≤−1.0.

7. The optical imaging lens assembly according to claim 1, wherein a radius of curvature R9 of an object-side surface of the fifth lens and a radius of curvature R10 of an image-side surface of the fifth lens satisfy: −3.0<R10/R9<−1.0.

8. The optical imaging lens assembly according to claim 1, wherein a radius of curvature R1 of the object-side surface of the first lens and the total effective focal length f of the optical imaging lens assembly satisfy: −2.5<R1/f<−1.0.

9. The optical imaging lens assembly according to claim 1, wherein a spacing distance T12 between the first lens and the second lens on the optical axis and a center thickness CT1 of the first lens on the optical axis satisfy: 1.0<T12/CT1<2.0.

10. The optical imaging lens assembly according to claim 1, wherein a spacing distance T56 between the fifth lens and the sixth lens on the optical axis and a center thickness CT6 of the sixth lens on the optical axis satisfy: 1.0≤T56/CT6<3.5.

11. The optical imaging lens assembly according to claim 1, wherein a center thickness CT2 of the second lens on the optical axis and a spacing distance T23 between the second lens and the third lens on the optical axis satisfy: 2.5<CT2/T23<4.5.

12. The optical imaging lens assembly according to claim 1, wherein half of a diagonal length ImgH of an effective pixel area on the image plane of the optical imaging lens assembly and the total effective focal length f of the optical imaging lens assembly satisfy: 1.5<ImgH/f<2.1.

13. An optical imaging lens assembly, comprising, sequentially along an optical axis from an object side to an image side:
    a first lens having a refractive power;
    a second lens having a refractive power, an object-side surface of the second lens being a concave surface;
    a third lens having a refractive power, an object-side surface of the third lens being a concave surface at the optical axis;
    a diaphragm;
    a fourth lens having a refractive power;
    a fifth lens having a negative refractive power, an object-side surface of the fifth lens being a concave surface; and
    a sixth lens having a negative refractive power, an image-side surface of the sixth lens being a convex surface at the optical axis, wherein half of a maximal field-of-view Semi-FOV of the optical imaging lens assembly satisfies: Semi-FOV≥70°, and a spacing distance T56 between the fifth lens and the sixth lens on the optical axis and a center thickness CT6 of the sixth lens on the optical axis satisfy: 1.0≤T56/CT6<3.5.

14. The optical imaging lens assembly according to claim 13, wherein an effective focal length f1 of the first lens and an effective focal length f4 of the fourth lens satisfy: −2.5<f1/f4<−1.5.

15. The optical imaging lens assembly according to claim 13, wherein an effective focal length f3 of the third lens and an effective focal length f5 of the fifth lens satisfy: 2.5<f3/f5<−1.5.

16. The optical imaging lens assembly according to claim 13, wherein a radius of curvature R3 of the object-side surface of the second lens and a radius of curvature R12 of the image-side surface of the sixth lens satisfy: 3.0<R12/R3<4.5.

17. The optical imaging lens assembly according to claim 13, wherein a radius of curvature R4 of an image-side surface of the second lens and a radius of curvature R5 of the object-side surface of the third lens satisfy: 1.0<|R5/R4|<5.0.

18. The optical imaging lens assembly according to claim 13, wherein a radius of curvature R6 of an image-side surface of the third lens and a radius of curvature R7 of an object-side surface of the fourth lens satisfy: −2.0<R6/R7≤−1.0.

19. The optical imaging lens assembly according to claim 13, wherein a radius of curvature R9 of an object-side surface of the fifth lens and a radius of curvature R10 of an image-side surface of the fifth lens satisfy: −3.0<R10/R9<−1.0.

20. The optical imaging lens assembly according to claim 13, wherein a radius of curvature R1 of the object-side surface of the first lens and the total effective focal length f of the optical imaging lens assembly satisfy: −2.5<R1/f<−1.0.

* * * * *